United States Patent
Namizuka et al.

(10) Patent No.: US 6,930,793 B1
(45) Date of Patent: Aug. 16, 2005

(54) IMAGE PROCESSING APPARATUS, IMAGE PROCESSING METHOD AND COMPUTER READABLE RECORDING MEDIUM FOR RECORDING PROGRAM FOR COMPUTER TO EXECUTE THE METHOD

(75) Inventors: Yoshiyuki Namizuka, Kanagawa (JP); Yuji Takahashi, Kanagawa (JP); Shinya Miyazaki, Tokyo (JP); Sugitaka Oteki, Tokyo (JP); Takako Satoh, Kanagawa (JP); Hiroaki Fukuda, Kanagawa (JP); Hiroyuki Kawamoto, Kanagawa (JP); Yasuyuki Nomizu, Kanagawa (JP); Fumio Yoshizawa, Kanagawa (JP); Hideto Miyazaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/551,509

(22) Filed: Apr. 17, 2000

(30) Foreign Application Priority Data

Apr. 30, 1999 (JP) ................................. 11-125059

(51) Int. Cl.⁷ ............................................ G06F 15/00
(52) U.S. Cl. ................... 358/1.16; 358/1.15; 358/1.13; 358/1.14
(58) Field of Search .............................. 358/1.15, 1.16, 358/1.13, 1.14, 1.9, 296, 442, 468, 452, 453; 382/300, 304, 282, 247

(56) References Cited

U.S. PATENT DOCUMENTS

| 5,050,221 A | 9/1991 | Ohta et al. |
| 5,410,619 A | 4/1995 | Fujisawa et al. |
| 5,650,861 A * | 7/1997 | Nakajima et al. ........... 382/239 |
| 6,041,139 A | 3/2000 | Okubo et al. |
| 6,188,803 B1 * | 2/2001 | Iwase et al. ................ 382/300 |
| 6,278,526 B1 * | 8/2001 | Kurozasa ................... 358/1.15 |
| 6,480,297 B1 * | 11/2002 | Suzuki et al. .............. 358/1.16 |

FOREIGN PATENT DOCUMENTS

| JP | 8-274986 | 10/1996 |
| JP | 10-312454 | 11/1998 |
| JP | 10-336366 | 12/1998 |

* cited by examiner

Primary Examiner—Twyler Lamb
(74) Attorney, Agent, or Firm—Oblon, Spivak, McClelland, Maier & Neustadt, P.C.

(57) ABSTRACT

In the image processing apparatus, an image data control unit is connected to at least one of an image reading unit, an image memory control unit, an image processing unit, and an image writing unit. The image data control unit receives any one of an image data read by the image reading unit, image data read by the image memory control unit, and image data processed by the image processing unit. The image data control unit transmits the received image data to any of the image memory control unit, the image processing unit, and the image writing unit.

24 Claims, 22 Drawing Sheets

FIG.12

|  | COLUMN | | | | |
|---|---|---|---|---|---|
|  | j-2 | j-1 | j | j+1 | j+2 |
| i-2 | A | B | C | D | E |
| i-1 | F | G | H | I | J |
ROW i | K | L | M | N | O |
| i+1 | P | Q | R | S | T |
| i+2 | U | V | W | X | Y |

IMAGE PROCESSING APPARATUS, IMAGE PROCESSING METHOD AND COMPUTER READABLE RECORDING MEDIUM FOR RECORDING PROGRAM FOR COMPUTER TO EXECUTE THE METHOD

FIELD OF THE INVENTION

The present invention relates to an image processing apparatus and an image processing method for processing digital image data, or especially, image data for a digital composite apparatus combining the functions of a copier, a facsimile, a printer, a scanner or the like and a computer readable recording medium for recording a program of the computer to execute the method.

BACKGROUND OF THE INVENTION

A digital copier which processes digitized image data from an analog copier is known. Further, a digital composite apparatus exists which combines the various functions including a facsimile, printer and a scanner in addition to the functions of a copier.

FIG. 22 is a block diagram showing a hardware configuration of such a digital composite apparatus according to the conventional art. As shown in FIG. 22, the digital composite apparatus comprises a section (copier section) constituting a copier configured with a series of component units including a read unit 2201, an image processing unit 2202, a video control unit 2203 and a write unit 2204, together with a memory control unit 2205 and a memory module 2206, to which a facsimile control unit 2212, a printer control unit 2213 and a scanner control unit 2214 or the like are additionally connected through a motherboard 221, thereby realizing the various functions of a digital composite apparatus.

In the copier section which realizes the function of a copier, a series of operation of the component units including the read unit 2201, the image processing unit 2202, the video control unit 2203 and the write unit 2204 is controlled by a system controller 2207, a RAM 2208 and a ROM 2209. The units including the facsimile control unit 2212, the printer control unit 2213 and the scanner control unit 2214, realize the functions thereof by utilizing part of the series of operation established in the copier.

In other words, the function of a digital composite apparatus is realized by adding the facsimile control unit 2212, the printer control unit 2213 and the scanner control unit 2214 to the copier section established as a system including the series of component units. This configuration is employed against the background of emphasizing (increasing) the processing speed by configuring the series of the component unit with the ASIC (Application Specific Integrated Circuit) hardware or the like.

An "image processing apparatus" (Japanese Unexamined Patent Application Laid-Open No. 8-274986, for example) is disclosed which performs the image processing of the read signal, the image accumulation in a memory, the concurrent operation of a plurality of functions and the optimization of the respective image processing. This apparatus can execute various image processing with a single image processing configuration.

In the digital composite apparatus according to the conventional art, however, the copier section is established as a system. Thus, there is a disadvantage that each of the unit connected to the copier section such as the facsimile control unit 2212, the printer control unit 2213 and the scanner control unit 2214 requires a system independent of the copier section if the respective functions thereof are to be realized.

Each of these unit is required to have a memory module of its own for realizing the function thereof. Each unit cannot effectively utilize the memory module 2206 of the copier section. Therefore, size and cost of the apparatus are disadvantageously increased due to the provision of a memory module for each unit.

Since the copier section is established as one system, there was the problem that the function cannot be efficiently improved in keeping with the performance improvement of the peripheral units. In the case where it is desired to change only the read unit 2201 and the write unit 2204, or more specifically, it is desired to change the read unit 2201 of 400 dpi or the write unit 2204 of 400 dpi to those of 600 dpi, the function of the whole apparatus cannot not be easily improved by merely replacing a unit.

In view of the fact that a system of the whole copier has already been established to read/write data with 400 dpi, the proposed change of the unit described above requires a corresponding change of the matrix size and the threshold value for intermediate processing. Also for other units, the setting may be required to be changed to permit to read/write operation with 600 dpi.

In the case where the apparatus is composed of a hardware configuration such as ASIC, therefore, the hardware itself (customized IC or LSI or the like) must be replaced. With the performance improvement of the peripheral units, the mere replacement of the peripheral units cannot easily make it possible for the apparatus to exhibit its functions.

These problems are not confined to the peripheral units but may be encountered similarly when attempting to improve the function such as the operability of the digital composite apparatus. In other words, for improving the function of the digital composite apparatus, the work of changing the whole system is required. The resulting problem is that not only the designer cannot easily improve the function of the digital composite apparatus but also the latest algorithm cannot be readily provided to the users of the digital composite apparatus.

Moreover, since the copier section is established as one system, the problem is that the functions cannot be easily segmented when using the digital composite apparatus as a scanner unit or a printer unit.

As described above, the conventional composite apparatus having the problem that the optimum control configuration is not attained from the view point of assuring the effective utilization of each resources including the sharing of a module, the improvement of the function by replacing individual units and the segmentation of a plurality of functions or the like.

SUMMARY OF THE INVENTION

It is an object of this invention to provide an image processing apparatus and an image processing method which effectively use the system resources to realize the multiple functions and can control the whole system optimally, and a computer readable recording medium which records the program for the computer to execute the method.

In order to solve the aforementioned problems and to achieve the aforementioned object, according to one aspect of the invention, there is provided an image processing apparatus comprising at least one of a image reading unit which reads an image data (first image data), a image memory control unit which writes/reads the image data (second image data) by controlling a memory, an image processing unit which processes the image data to obtain a third image data, and an image writing unit which prints an image corresponding to the image data on a paper; and an image data control unit which receives at least one of the first image data, the second image data, and the third image data, and transmits received image data to any one of the image memory control unit, the image processing unit, and the image writing unit. Accordingly, the performance of processing the image data can be optimized.

According to another aspect of the invention, there is provided an image processing apparatus comprising at least one of a image reading unit which reads an image data (first image data), an image processing unit which processes the image data to obtain a second image data, and an image writing unit which prints an image corresponding to the image data on a paper; and an image data control unit which receives at least one of the first image data and the second image data, and stores the received image data into a memory, and transmits the image data stored in the memory to any one of the image processing unit and the image writing unit. Accordingly, the image memory can be effectively utilized while optimizing the processing of the accumulated image.

Further, the image memory control unit has been connected through the image data control unit to any of the image reading unit, the image processing unit, and the image writing unit, and the image data control unit transmits the image data to or receives the image data from the image memory control unit and any one of the image reading unit, the image processing unit, and the image writing unit. Accordingly, the adaptation of the image memory control to the input/output devices can be controlled.

According to still another aspect of the invention, there is provided an image processing apparatus comprising at least one of a image reading unit which reads an image data (first image data), a image memory control unit which writes/reads the image data (second image data) by controlling a memory, and an image writing unit which prints an image corresponding to the image data on a paper; and an image processing unit which receives at least one of the first image data and the second image data, processes the received image, and transmits the processed image data stored in the memory to any one of the image memory control unit and the image writing unit. Accordingly, the image processing of the image data can be optimized.

Further, the image processing unit has been connected through the image data control unit to any of the image reading unit, the image memory control unit, and the image writing unit, and the image data control unit transmits the image data to or receives the image data from the image processing unit and any one of the image reading unit, the image memory control unit, and the image writing unit. Accordingly, the adaptation of the image processing to the input/output devices can be controlled.

Further, the image processing unit comprises a correcting unit which corrects the deterioration of the information of the first image data; and an image quality processing unit which processes the image quality of the image data corrected by the correcting unit or the second image data in accordance with the image formation characteristic. Accordingly, the image processing of the image data read can be optimized.

Further, the image processing is realized with a processor and the program of this processor is changeable. Accordingly, the requirement for the change of the system specification and the addition of functions can be easily met by changing the program.

Further, the image processing is realized with an SIMD (Signal Single Instruction Multiple Data stream) processor. Accordingly, the image processing can be performed with high-speed arithmetic operation.

The apparatus further comprises a first processor which controls any of the image reading unit, the image processing unit, and the image writing unit through a first bus; and a second processor which controls the image memory control unit through a second bus, wherein the image data control unit controls the interface between the first bus and the second bus. Accordingly, the transmission and reception of image data between the various means controlled by different processors can be carried out smoothly.

The apparatus further comprises a facsimile control unit connected to any of the image memory control unit and the image data control unit through the second bus, which facsimile control unit transmits or receives a facsimile image from or to any of the image memory control unit and the image data control unit. Accordingly, the image memory can be effectively used in the transmission/receiving process of the facsimile image.

Further, the image read means, the image data control means, the image reading unit, the image data control unit, the image memory control unit, the image processing unit, the image writing unit, and the facsimile control unit are configured as independent units. Accordingly, the equipment can be easily produced differently and therefore a multi-purpose system can be constructed with low cost.

According to still another aspect of the invention, there is provided an image processing method comprising the steps of receiving the image data from any one of a plurality of processing units for processing the image data differently, including the image data read process, the accumulation, image processing (manipulation and editing), write operation and the transmission/receiving process; acquiring the image data control information including the information on the contents of the processing for the image data received at the image data receiving step; determining a destination processing unit for transmitting the image data received by the image data receiving step, based on the image data control information acquired at the image data control information acquisition step; and transmitting the image data to the destination processing unit determined by the destination processing unit. Accordingly, the performance of processing image data can be optimized.

The method further comprises a step of inputting the image data control information, wherein the image data control information acquiring step acquires the image data control information input at the input step. Accordingly, the performance of processing the image data can be optimized by the input image data control information.

According to still another aspect of the invention, there is provided a recording medium for storing a program for the computer to execute the method mentioned above so that the program can be read automatically, thereby making it possible for the computer to perform the operation of the twelfth or thirteenth aspect.

Other objects and features of this invention will become apparent from the following description with reference to the accompanying drawings.

BRIEF DESCRIPTION OF THE DRAWINGS

FIG. 12 is a diagram for explaining an outline of a scanner (an example of a space filter) of an image processing apparatus according to an embodiment.

DESCRIPTION OF THE PREFERRED EMBODIMENTS

The image processing apparatus, the image processing method and a computer readable recording medium for recording a program executed by the computer according to preferred embodiments of this invention will be explained in detail with reference to the accompanying drawings.

Figure 1:
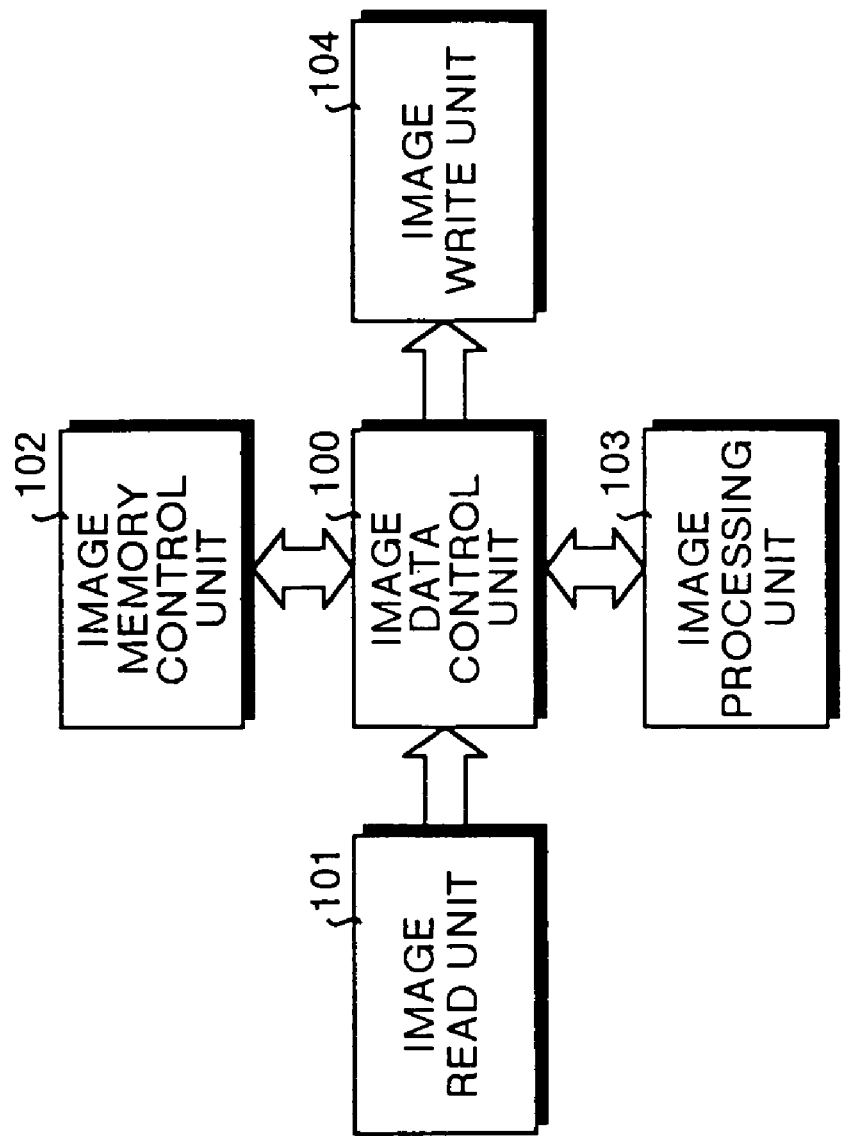
FIG. 1 is a block diagram functionally showing the configuration of an image processing apparatus according to an embodiment of the invention.

First, the principle of the image processing apparatus according to an embodiment will be explained. FIG. 1 is a block diagram functionally showing a configuration of an image processing apparatus according to an embodiment of this invention. As shown in FIG. 1, the image processing apparatus is configured with five units described below.

The five units are image data control unit 100, image read unit 101 which reads the image data, image memory control unit 102 for which read/writes the image data by controlling an image memory which accumulates the images, image processing unit 103 which performs the image processing such as manipulation and editing of the image data, and image write unit 104 which writes the image data on the transfer paper or the like.

These units are built around the image data control unit 100 in such a manner that the image read unit 101, the image memory control unit 102, the image processing unit 103 and the image write unit 104 are connected to the image data control unit 100.

The image data control unit 100, for example, performs the following processes.

(1) Compresses the data (primary compression) for improving the efficiency of data transfer in a bus, (2) Transfers the primary compressed data to the image data, (3) Image synthesis (the synthesis of image data from a plurality of units is possible, including the synthesis on the data bus), (4) Image shifting (shifting the image in main scanning direction and subsidiary scanning direction), (5) Image area expansion (the image area can be enlarged by an arbitrary amount to the peripheral area), (6) Changing the magnification of the image (change to fixed magnification of 50% or 200%, for example), (7) Parallel bus interfacing, (8) Serial bus interfacing (interfacing with a process controller 211 described later), (9) Format conversion between parallel data and serial data,

(10) Interfacing with the image read unit 101, and

(11) Interfacing with the image processing unit 103.

The image read unit 101, for example, performs the following processes.

(1) The optical system reads the light reflected from the paper to be read, (2) Conversion into electrical signal by CCD (Charge Coupled Device), (3) Digitization in A/D converter, (4) Shading correction (correcting the irregular illuminance distribution of light source), and (5) Scanner γ correction (correcting the density characteristic of read unit).

The image memory control unit 102, for example, performs the following processes.
(1) Controlling interface with system controller,
(2) Parallel bus control (controlling interface with parallel bus),
(3) Network control,
(4) Serial bus control (controlling a plurality of external serial ports),
(5) Internal bus interface control (command control with operating unit),
(6) Local bus control (access control of ROM, RAM and font data for activating system controller),
(7) Memory module operation control (controlling write/read operation of memory module),
(8) Memory module access control (arbitration of memory access requests from a plurality of units),
(9) Data compression/expansion (reducing data amount for effective memory utilization), and
(10) Image editing (clearing memory area of data, rotation of image data and image synthesis on memory).

The image processing unit 103 performs, for example, the following processes.
(1) Shading correction (correcting irregular illuminance distribution of light source),
(2) Scanner γ correction (correcting the density characteristic of read unit),
(3) MTF correction,
(4) Smoothing,
(5) change of magnification to any specific value in main scanning direction,
(6) Density conversion (γ conversion corresponding to density notch),
(7) Simple conversion to multi-value,
(8) Simple digitization,
(9) Error diffusion,
(10) Dithering,
(11) Dot arrangement phase control (right-sided dot, left-sided dot),
(12) Isolated point removal,
(13) Image area separation (color determination, attribute determination and adaptation), and
(14) Density conversion.

The image write unit performs, for example the following processes.
(1) Edge smoothing (jaggies correction),
(2) Correction for dot rearrangement,
(3) Image signal pulse control, and
(4) Format conversion between parallel data and serial data.

Figure 2:
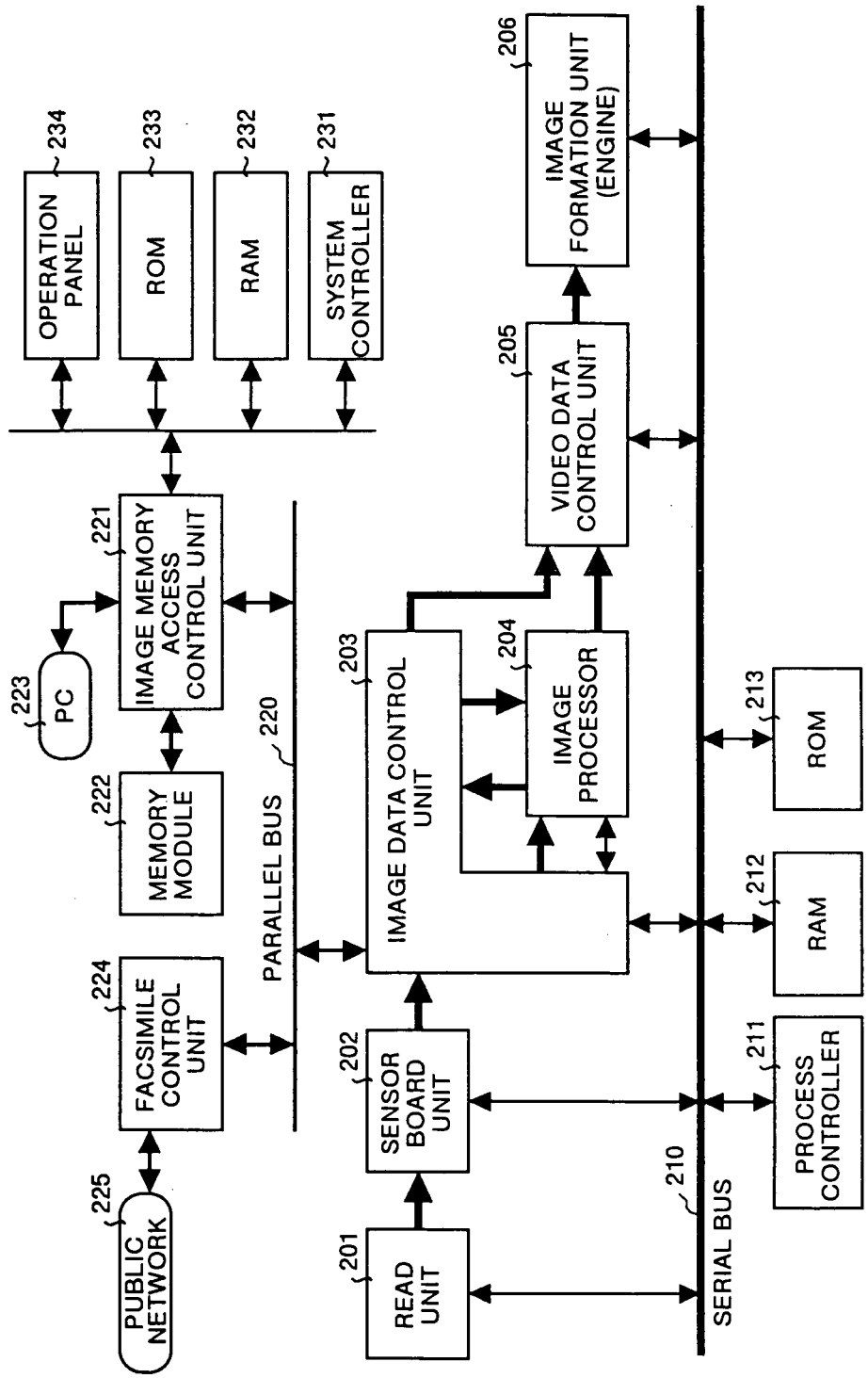
FIG. 2 is a block diagram showing an example of a hardware configuration of the image processing apparatus according to an embodiment.

The hardware configuration of a digital composite apparatus constituted of an image processing apparatus according to this embodiment will be explained here. FIG. 2 is a block diagram showing an example of the hardware configuration of an image processing apparatus according to this embodiment.

As shown in FIG. 2, the image processing apparatus comprises a read unit 201, a sensor board unit 202, an image data control unit 203, an image processor 204, a video data control unit 205 and an image formation unit (engine) 206. The image processing apparatus further comprises a process controller 211, a RAM 212 and a ROM 213 connected by a serial bus 210.

The image processing apparatus further comprises an image memory access control unit 221 and a facsimile control unit 224 connected by a parallel bus 220. The image processing apparatus further comprises a memory module 222, a system controller 231, a RAM 232, a ROM 233 and an operation panel 234 connected to the image memory access control unit 221.

The relation between the component described above and the units 100 to 104 shown in FIG. 1 will be explained here. The read unit 201 and the sensor board unit 202 realize the function of the image read unit 101. Similarly, the image data control unit 203 realizes the function of the image data control unit 100. Further, the image processor 204 realizes the function of the image processing unit 103.

Further, the video data control unit 205 and the image formation unit (engine) 206 realize the function of the image write unit 104. Further, the image memory access control unit 221 and the memory module 222 realize the function of the image memory control unit 102.

Each component will be explained in detail. The read unit 201 for optically reading the paper includes a lamp, a mirror and a lens. The light radiated and reflected on the paper is focused on a photo-detector using the mirror and the lens.

The photo-detector is, for example the CCD and it is mounted on the sensor board unit 202. The image data is converted into electrical signal by the CCD. After that the image data is converted into a digital signal and output (transmitted) from the sensor board unit 202.

The image data output from the sensor board unit 202 is input into the image data control unit 203. The transmission of the image data between a functional device (processing unit) and the data bus is totally controlled by the image data control unit 203.

The image data control unit 203 controls the image data transfer between the sensor board unit 202, the parallel bus 220 and the image processor 204, and holds communication of the image data between the process controller 211 and the system controller 231 in charge of overall control of the image processing apparatus. The RAM 212 is used as a work area of the process controller 211. The ROM 213 stores the boot program or the like of the process controller 211.

The image data output from the sensor board unit 202 is input into the image processor 204 through the image data control unit 203. The image processor 204 corrects the signal deterioration (assumed to be the signal deterioration in the scanner system) in the optical system and due to the quantization to the digital signal, and after processing returns the data again to the image data control unit 203.

The image memory access control unit 221 controls the operation of writing/reading the image data into and from the memory module 222. The image memory access control unit 221 also controls the operation of each component part connected to the system parallel bus 220. The RAM 232 is used as a work area of the system controller 231. The ROM 233 stores the boot program of the system controller 231.

The operation panel 234 is used when indicating the processes to be performed by the image processing apparatus. For example, the type of the process (copy, facsimile transmission, image reading, printing or the like) and the number of papers to be processed are input. Thus, the operation panel 234 is used to input the image data control information. The details of the facsimile control unit 224 will be explained later.

Two jobs are performed with respect to the read image data. One is to accumulate and reuse the read image data in the memory module 222, and the other is not to accumulate the image data in the memory module 222. Each job will be explained. An example of accumulating image data in the memory module 222 is the case in which contains contents of one paper are copied on a plurality of papers. In this case, the read unit 201 is operated only once, the image data read by the read unit 201 is accumulated in the memory module 222, and the image data thus accumulated are read out a plurality of times.

An example of not using the memory module 222 is the case in which contents of one paper is copied on only one paper. The read image data is reproduced as it is, and therefore the access to the memory module 222 by the image memory access control unit 221 is not required.

When the memory module 222 is not used, the data transferred from the image processor 204 to the image data control unit 203 is returned again from the image data control unit 203 to the image processor 204. The image processor 204 processes the image quality for converting the brightness data of the CCD in the sensor board unit 202 to the dot area tone.

The image data thus subjected to image quality processing is transferred from the image processor 204 to the video data control unit 205. The signal converted to the dot area tone is subjected to post-processing for dot arrangement and the pulse control for dot reproduction, after which a reproduced image is formed on the transfer paper in the image formation unit 206.

The flow of the image data in the case of an additional processing such as rotation of the image orientation and image synthesis performed at the time of reading the image accumulated in the memory module 222. The image data transferred from the image processor 204 to the image data control unit 203 is sent from the image data control unit 203 through the parallel bus 220 to the image memory access control unit 221.

Under the control of the system controller 231, the access of the memory module 222 and the image data is controlled, the printing data for the external PC (personal computer) 223 is unfolded, and the image data is compressed/expanded for effective utilization of the memory module 222.

The image data sent to the image memory access control unit 221, after data compression, is accumulated in the memory module 222. The accumulated data is read as required. The image data read out is expanded, restored to the original image data, and returned from the image memory access control unit 221 through the parallel bus 220 to the image data control unit 203.

After transfer from the image data control unit 203 to the image processor 204, the data is subjected to image quality processing and the pulse control in the video data control unit 205, so that the reproduced image is formed on the paper in the image formation unit 206.

In the image data flow, the function of the digital composite apparatus is realized by bus control in the parallel bus 220 and the image data control unit 203. The facsimile transmission function carries out the image processing of the read image data in the image processor 204, and through the image data control unit 203 and the parallel bus 220, the image data is transferred to the facsimile control unit 224. After data conversion in the facsimile control unit 224 for the communication network, the image data is transmitted to the public network 225 as facsimile data.

The facsimile data received, which constitutes channel data from the public network 225, is converted into image data in the facsimile control unit 224, and through the parallel bus 220 and the image data control unit 203, transferred to the image processor 204. In this process, no special image quality processing is conducted, but the dot rearrangement and the pulse control are carried out in the video data control unit 205, so that a reproduced image is formed on the paper in the image formation unit 206.

Under the condition of parallel operation of a plurality of jobs including the copy function, the facsimile transmission/reception function and the printer output function, the assignment of the right to use the read unit 201, the image formation unit 206 and the parallel bus 220 is controlled in the system controller 231 and the process controller 211.

The process controller 211 controls the flow of the image data. The system controller 231 controls the complete system and management of activation of each resource. The function of the digital composite apparatus is selected and input using the operation panel 234 thereby to set the copy function, facsimile function or other processing specifics.

The system controller 231 and the process controller 211 perform mutual communication through the parallel bus 220, the image data control unit 203 and the serial bus 210. Specifically, the data format is converted for data interface with the parallel bus 220 and the serial bus 210 in the image data control unit 203, so that the system controller 231 and the process controller 211 hold communication with each other.

Figure 3:
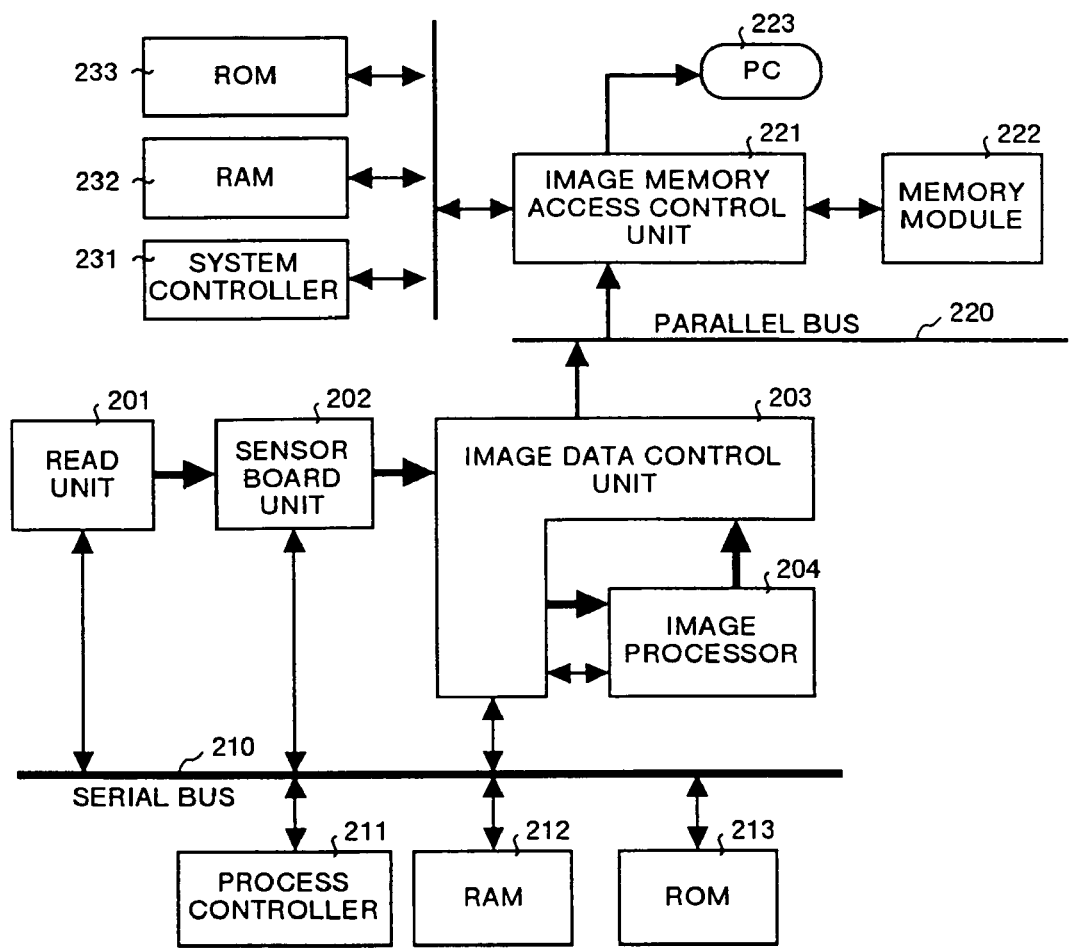
FIG. 3 is a block diagram showing another example of a hardware configuration of the image processing apparatus according to an embodiment.

The hardware configuration of the image processing apparatus when it functions only as a scanner is explained below. FIG. 3 shows this configuration. The components that correspond to the parts in FIG. 2 are designated by the same reference numerals in FIG. 3, respectively, and will not be described.

The conspicuous difference between FIG. 2 and FIG. 3 is that the image formation unit 206 shown in FIG. 2 is absent in FIG. 3. This image formation unit is not required, and therefore the video data control unit 205 is not mounted either.

The image data read in the read unit 201 is converted into digital data in the sensor board unit 202. The data is then transferred to the image processor 204 through the image data control unit 203. After that the image processing required as a unit scanner is performed in the image processor 204.

The main image processing required to be performed in the scanner is the correction of deterioration of the read image. However, the tone processing suited to the display unit using a screen can also be carried out. Thus, the process is considerably different from the image quality processing intended for transfer to the paper.

By constituting the image processor 204 of a programmable arithmetic processing unit, all that is needed is to set the processing steps required for the image quality processing of the transfer paper and the screen tone processing. It is not always necessary that the steps for both the image quality processing and the tone processing are prepared.

After tone processing, the image data is transferred to the image data control unit 203, and through the parallel bus 220, transmitted to the image memory access control unit 221. The memory module 222 is used as a buffer memory, and the image data is transferred to the driver associated with PC 223, thereby realizing the scanner function.

Like in the digital composite apparatus, the system controller 231 and the process controller 211 manage the system resources and the image data.

Figure 4:
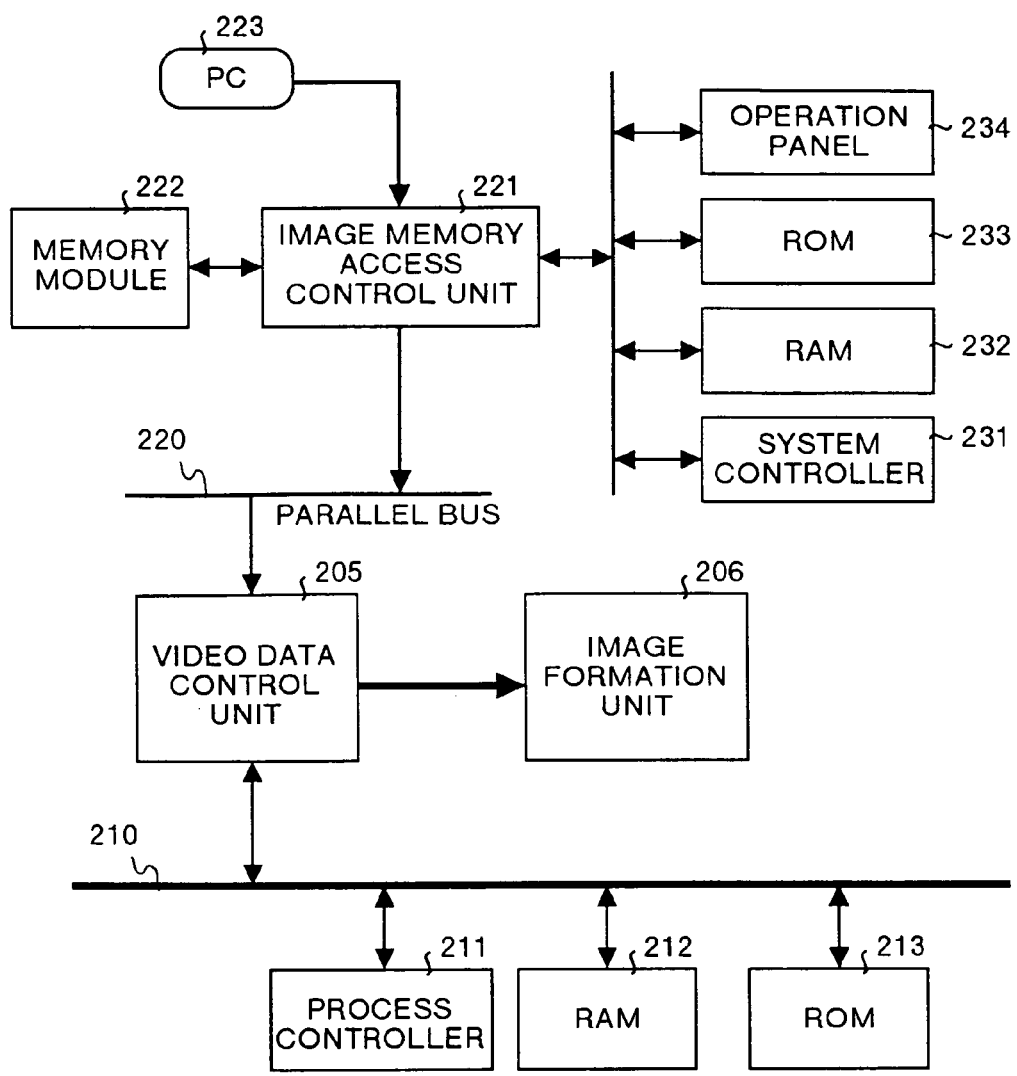
FIG. 4 is a block diagram showing still another example of a hardware configuration of the image processing apparatus according to an embodiment.

The hardware configuration of the image processing apparatus when it functions only as a printer is explained below. FIG. 4 shows this configuration. The components that correspond to the parts in FIG. 2 are designated by the same reference numerals in FIG. 4, respectively.

The conspicuous difference between FIG. 2 and FIG. 4 is that the read unit 201 shown in FIG. 2 is absent in FIG. 4. There is no need read the image, and therefore neither the sensor board unit 202 nor the image processor 204 is mounted. The image data is directly coupled to the video data control unit 205 from the parallel bus 220, and therefore the image data control unit 203 is not required either.

The image data (code data) to be output as a print from the PC 223 is input from the image memory access control unit 221. In the image memory access control unit 221, the code data is expanded to the image data under the control of the system controller 231. The data after the expansion is stored in the memory module 222.

The image data is read from the memory module 222, and through the parallel bus 220, transferred to the video data control unit 205. In the video data control unit 205, the dot rearrangement and the pulse control are carried out, so that a reproduced image is formed on the paper in the image formation unit 206.

The image data is expanded in the system controller 231, and the image data is output by the process controller 211. The format conversion of parallel and serial data between the system controller 231 and the process controller 211 may be carried out in the video data control unit 205.

Figure 5:
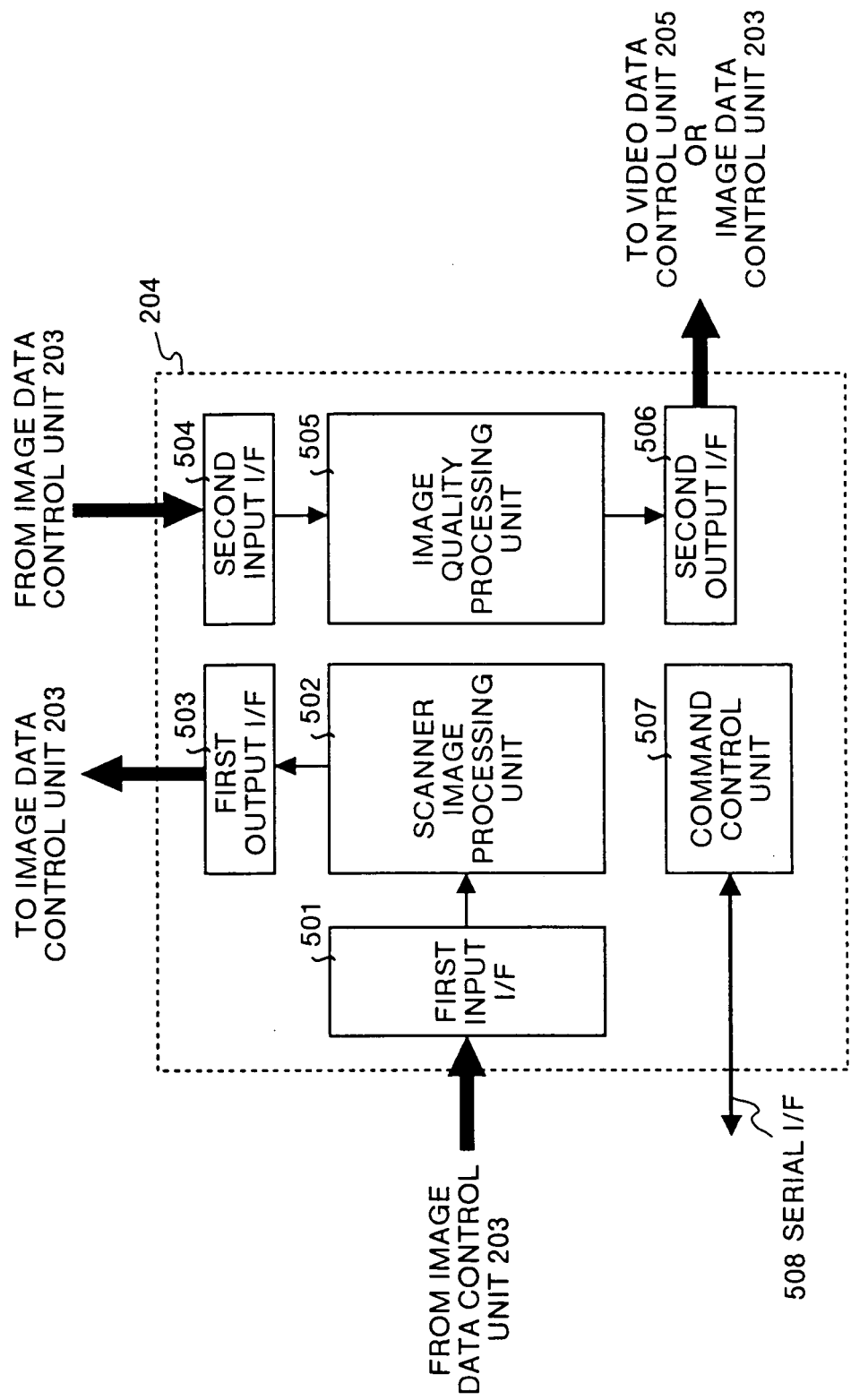
FIG. 5 is a block diagram schematically showing an image processor of the image processing apparatus according to an embodiment.

The outline of the processing in the image processor 204 making up the image processing unit 103 will be explained here. FIG. 5 is a block diagram showing an outline of the processing in the image processor 204 of the image processing apparatus.

As shown in FIG. 5, the image processor 204 includes a first input I/F 501, a scanner image processing unit 502, a first output I/F 503, a second input I/F 504, an image quality processing unit 505 and a second output I/F 506.

The image data that has been read is transmitted through the sensor board unit 202 and the image data control unit 203 to the scanner image processing unit 502 from the first input interface (I/F) 501 of the image processor 204.

The scanner image processing unit 502 corrects the deterioration of the image data that has been read. Specifically, it carries out the shading correction, the scanner γ correction and the MTF correction. It can also change the magnification of the image by enlargement or reduction. Upon complete correction of the image data that has been read, the image data is transferred through the first output interface (I/F) 503 to the image data control unit 203.

When the data is output and printed on the transfer paper, the image data from the image data control unit 203 is received from the second input I/F 504, and the dot area tone processing is effected in the image quality processing unit 505. After this processing, the image data is output through the second output I/F 506 to the video data control unit 205 or the image data control unit 203.

The dot area tone processing in the image quality processing unit 505 mainly include the density conversion, the dither processing, the error diffusion and the area approximation of the tone information. Once the image data processed by the scanner image processing unit 502 is accumulated in the memory module 222, various reproduced images can be checked by changing the image quality processing in the image quality processing unit 505.

For example, the density of the reproduced image is manipulated (changed) or the number of lines of the dither matrix is changed, thereby making it possible to change the environment of the reproduced image easily. In this process, the image is not required to be read through the read unit 201 each time the process is changed. Instead, by reading the image data accumulated in the memory module 222, different processing can be carried out any number of times for the same image data.

In the case of the scanner, the scanner image processing and the tone processing are carried out at the same time, and the result is output to the image data control unit 203. The specific processing can be changed in a programmable way. The selection of the process, change of the processing steps or the like are managed in the command control unit 507 through the serial I/F 508.

Figure 6:
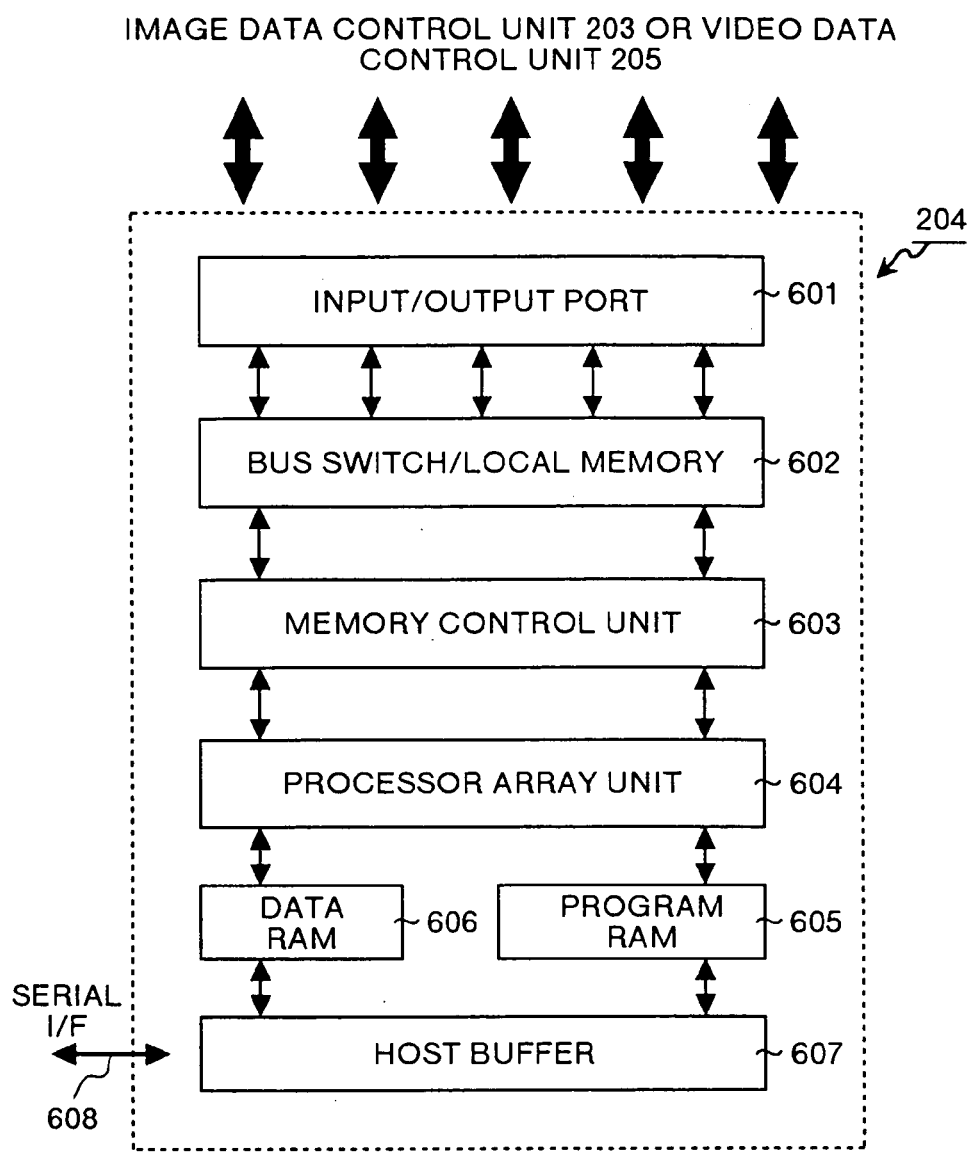
FIG. 6 is a block diagram showing the internal configuration of the image processor of the image processing apparatus according to an embodiment.

The internal configuration of the image processor 204 will be explained here. FIG. 6 shows the internal configuration of the image processor 204. As shown in FIG. 6, the image processor 204 comprises a plurality of input/output ports 601 are provided for data input/output from and to an external device. The input and output of each data can be set arbitrarily.

Internal bus switch/local memory 602 is provided in such a manner as to connect to the input/output port 601 for controlling the memory area to use and the data bus in the memory control unit 603. The data that has been input and data to be output are assigned and stored in the bus switch/local memory 602 as buffer memories, thereby controlling the I/F with an external device.

The image data stored in the bus switch/local memory 602 is subjected to various processing in the processor array unit 604, and the output result (processed image data) is stored again in the bus switch/local memory 602. The processing steps of the processor array unit 604 and the parameters for the processing are exchanged between the program RAM 605 and the data RAM 606.

The contents of the program RAM 605 and the data RAM 606 are downloaded from the host buffer 607 by the process controller 211 through the serial I/F 608. This serial I/F 608 is same as the serial I/F 508 of FIG. 5. The process controller 211 reads the contents of the data RAM 606 and monitors the progress of the processing.

In the case where the process contents are changed or the form of processing required of the system is changed, the processor array unit 604 updates the contents of the program RAM 605 and the data RAM 606 involved to meet the requirement.

Figure 7:
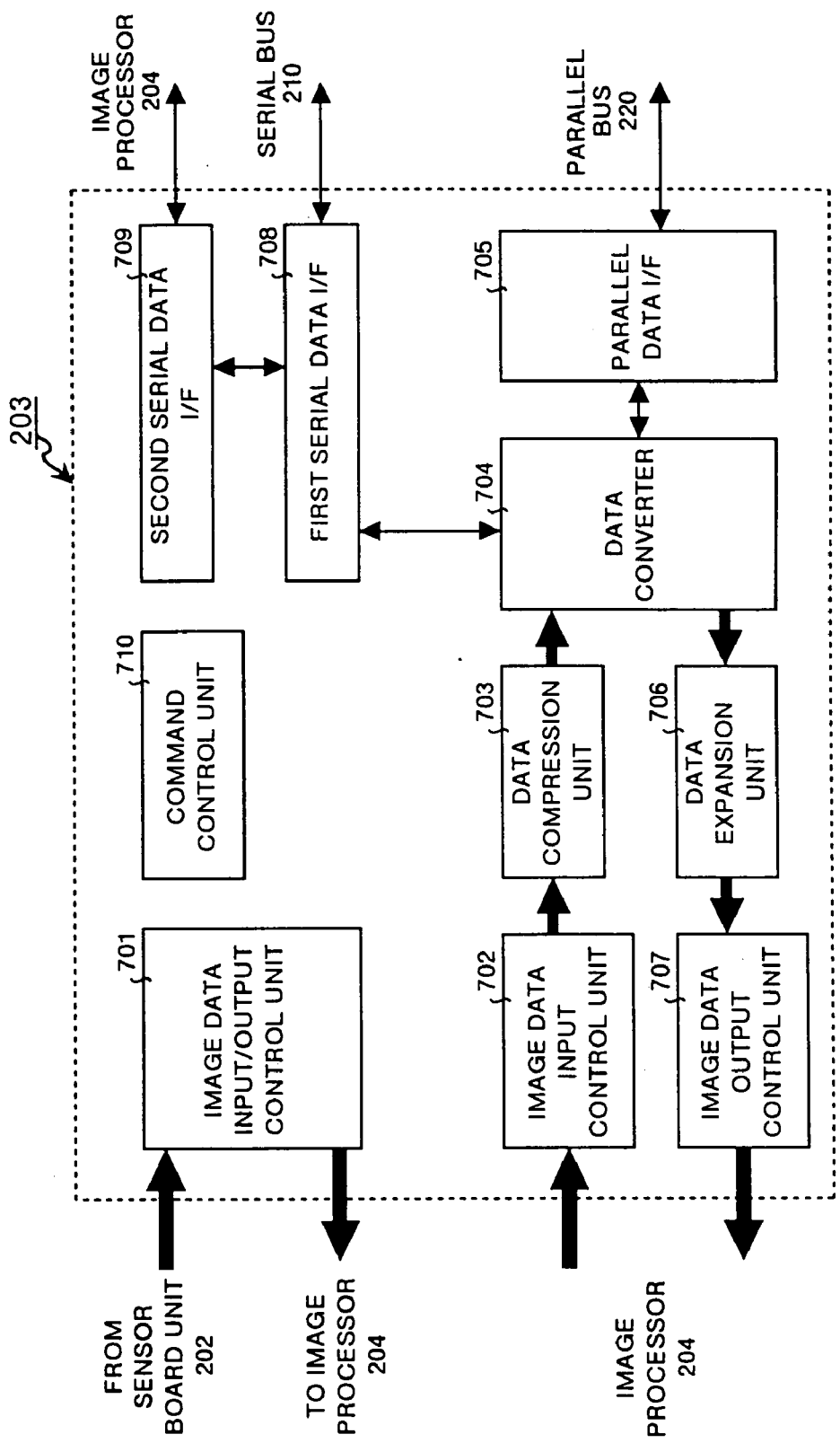
FIG. 7 is a block diagram showing an outline of the processing of an image data control unit of the image processing apparatus according to an embodiment.

An outline of the processing in the image data control unit 203 making up the image data control unit 100 will be explained here. FIG. 7 is a block diagram showing the outline of the processing of the image data control unit 203.

As shown in FIG. 7, the image data input/output control unit 701 receives the image data from the sensor board unit 202 and outputs the image data to the image processor 204. Specifically, the image data input/output control unit 701 is a section that connects the read unit 101 and the image processing unit 103 (image processor 204), and makes up an input/output unit dedicated to the transmission of the image data read by the read unit 101 to the image processing unit 103.

The image data input control unit 702 is supplied with receives the image data corrected as a scanner image in the image processor 204. The input image data is compressed in the data compression unit 703 in order to improve the transmission efficiency in the parallel bus 220. After that, the image data is sent out to the parallel bus 220 through the data converter 704 and the parallel data I/F 705.

The image data input from the parallel bus 220 through the parallel data I/F 705, which is compressed for bus transfer, is sent through the data converter 704 to the data expansion unit 706, where it is expanded. The image data thus expanded is transferred to the image processor 204 by the image data output control unit 707.

The image data control unit 203 also has the function of converting the parallel and serial data. The system controller 231 transfers the data to the parallel bus 220, while the process controller 211 transfers the data to the serial bus 210.

The image data control unit 203 converts the data for holding communication of the two controllers.

The serial data I/F has a first serial data I/F 708 for exchanging data with the process controller through the serial bus 210 and a second serial data I/F 709 used for exchanging data with the image processor 204. Provision of an independent system with the image processor 204 can smooth the interface with the image processor 204.

The command control unit 710 controls the operation of each component unit and each interface in the image data control unit 203 in accordance with an instruction that has been input.

Figure 8:
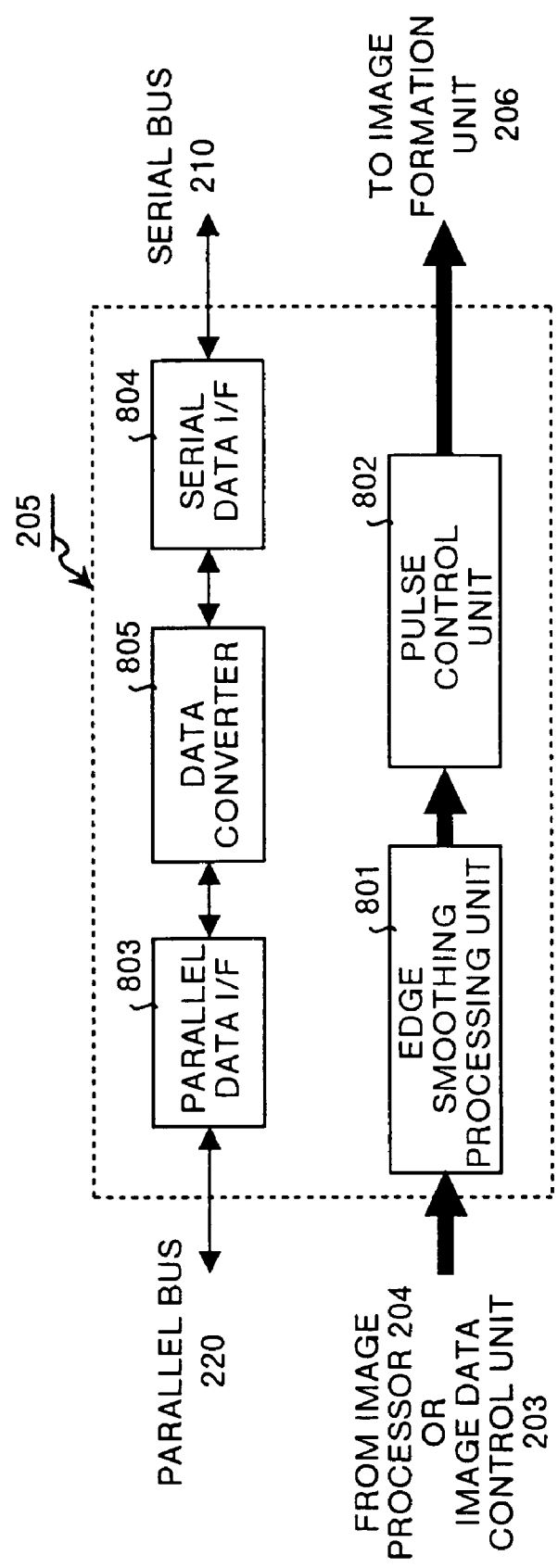
FIG. 8 is a block diagram showing an outline of the video data processing of the image processing apparatus according to an embodiment.

An outline of the processing in the video data control unit 205 making up a part of the image write unit 104 will be explained here. FIG. 8 is a block diagram showing the outline of the processing in the video data control unit 205.

As shown in FIG. 8, the video data control unit 205 additionally processes the input image data in accordance with the characteristic of the image formation unit 206. Specifically, the edge smoothing processing unit 801 rearranges the dots by the edge smooth processing, and the pulse control unit 802 carries out the pulse control of the image signal for forming dots, so that the image data subjected to these processing steps is output to the image formation unit 206.

Apart from the image data conversion, the apparatus has the format conversion function of parallel data and serial data. Thus, even the video data control unit 205 as a unit can meet the communication-requirement of the system controller 231 and the process controller 211. Specifically, the two data formats are converted by the provision of the parallel data I/F 803 for transmitting/receiving the parallel data, the serial data I/F 804 for transmitting/receiving the serial data, and the data converter 805 for mutually converting the data received by the parallel data I/F 803 and the serial data I/F 804.

Figure 9:
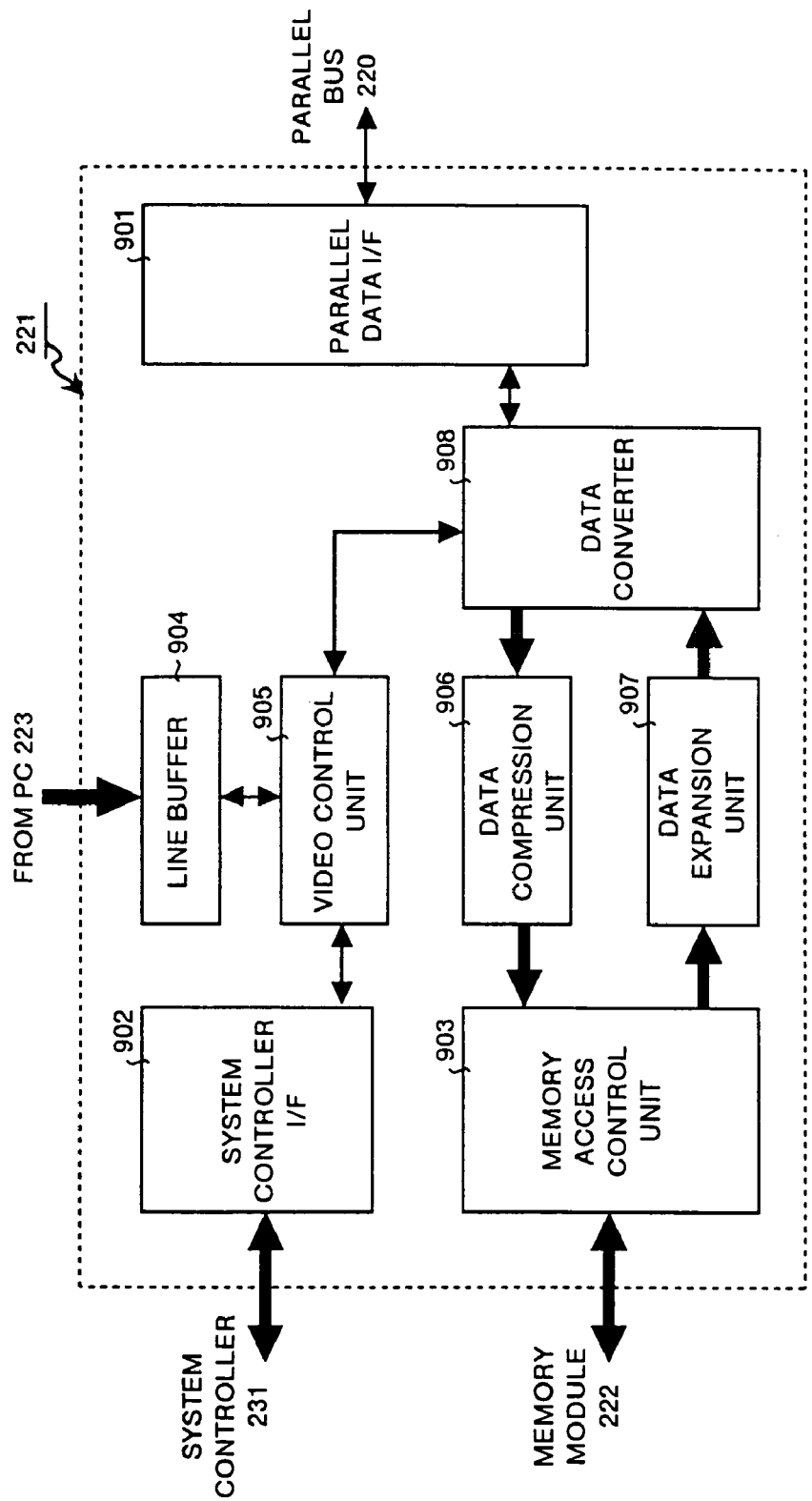
FIG. 9 is a block diagram showing an outline of the processing of an image memory access control unit of the image processing apparatus according to an embodiment.

An outline of the processing in the image memory access control unit 221 making up a part of the image memory control unit 102 will be explained here. FIG. 9 shows an outline of the processing in the image memory access control unit 221.

As shown in FIG. 9, the image memory access control unit 221 manages the interface of the image data with the parallel bus 220, controls the access of the image data, i.e. the storage (write)/read operation in the memory module 222, and controls the expansion into the image data of the code data input mainly from the externally PC 223.

For this purpose, the image memory access control unit 221 includes a parallel data I/F 901, a system controller I/F 902, a memory access control unit 903, a line buffer 904, a video control unit 905, a data compression unit 906, a data expansion unit 907 and a data converter 908.

The parallel data I/F 901 manages the interface of the image data with the parallel bus 220. The memory access control unit 903 controls the access of the image data to the memory module 222, i.e. the storage (write)/read operation.

The code data that has been input is stored in the local area of the line buffer 904. The code data stored in the line buffer 904 is expanded to the image data in the video control unit 905 based on the expansion processing instruction from the system controller 231 input through the system controller I/F 902.

The image data thus expanded or input from the parallel bus 220 through the parallel data I/F 901 are stored in the memory module 222. The image data to be stored is selected in the data converter 908, and the data is compressed in the data compressor 906 for improving the memory operating efficiency. While managing the address of the memory module 222 in the memory access control unit 903, the image data is stored (written) in the memory module 222.

In reading the image data stored (accumulated) in the memory module 222, the address to be read is controlled in the memory access control unit 903, and the image data that has been read is expanded in the data expander 907. The image data thus expanded is transferred to the parallel bus 220, if any, through the parallel data I/F 901.

Figure 10:
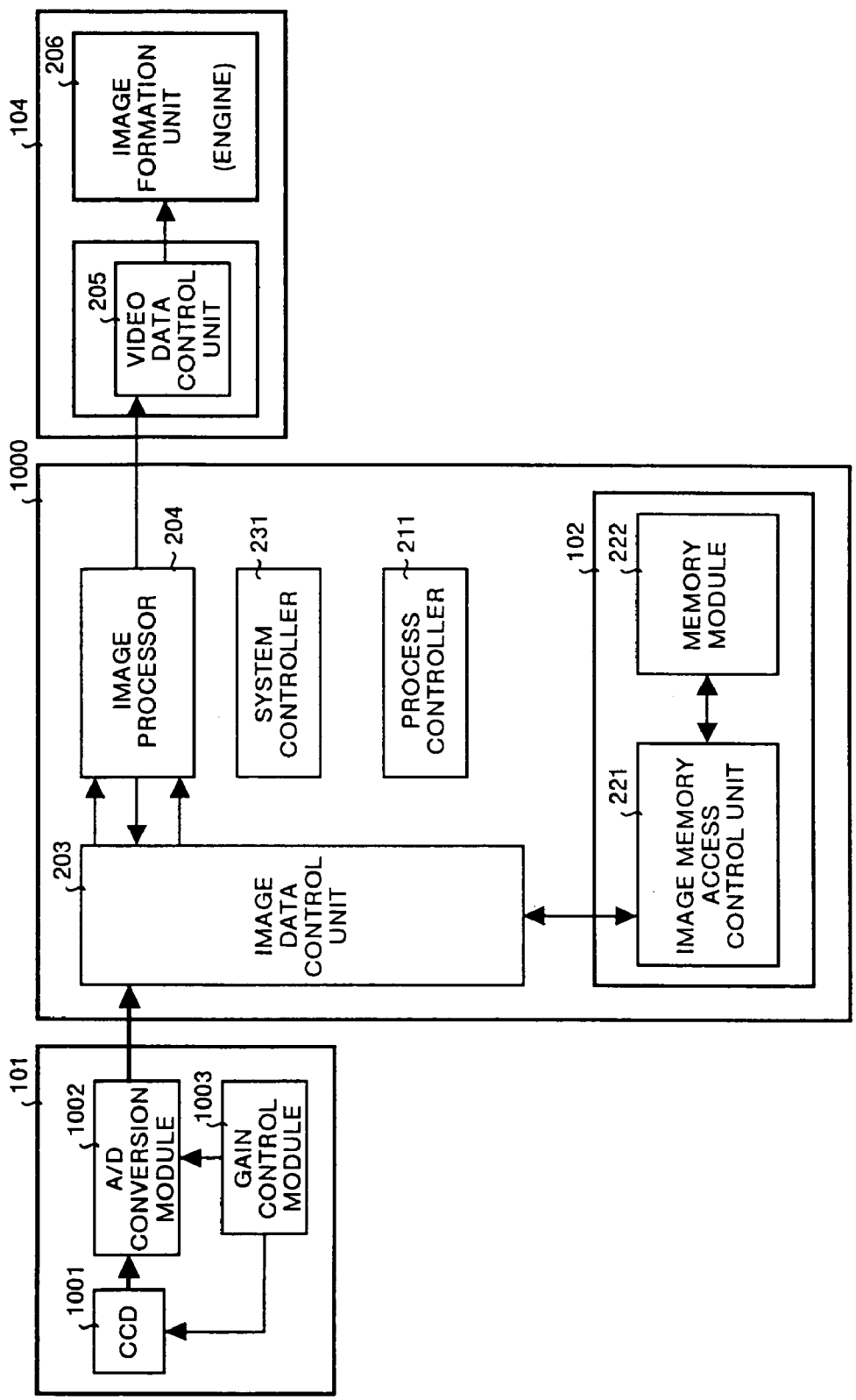
FIG. 10 is a block diagram showing an example of the unit configuration of an image processing apparatus according to an embodiment.
Figure 11:
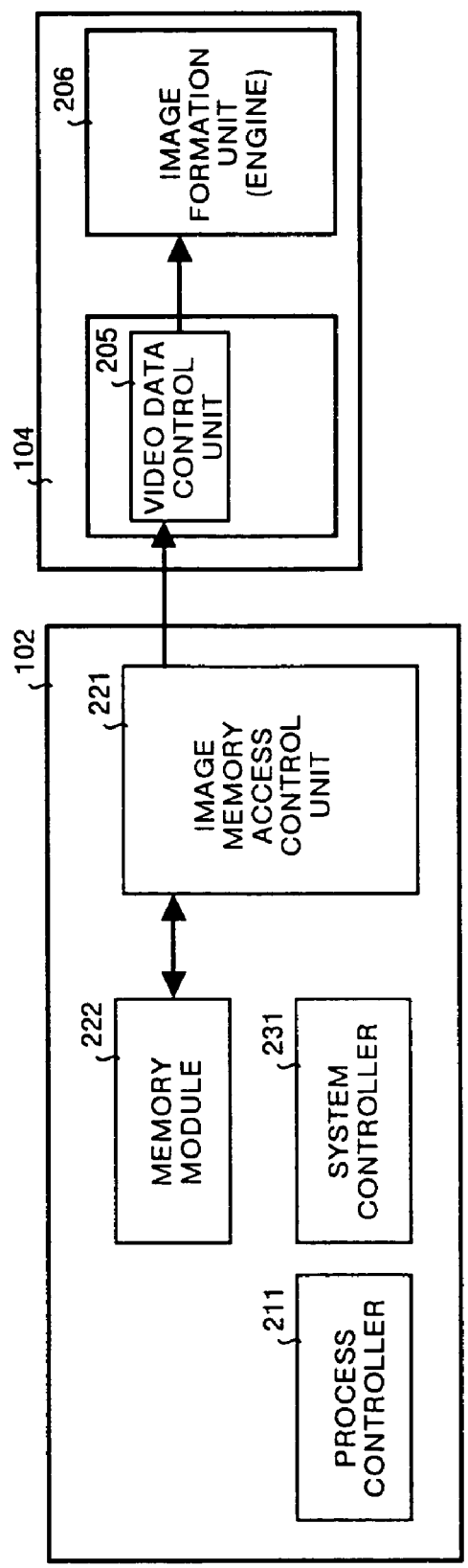
FIG. 11 is a block diagram showing another example of the unit configuration of an image processing apparatus according to an embodiment.

Unit configuration of the image processing apparatus will be explained here. FIG. 10 is a block diagram showing an example of the unit configuration of the image processing apparatus making up a digital composite apparatus. FIG. 11 is a block diagram showing an example of the unit configuration of the image processing apparatus as a printer only.

As shown in FIG. 10, the digital composite apparatus is configured with three units including an image read unit 101, an image engine control unit 1000 and an image write unit 104. Each unit can be managed on an independent PCB substrate.

The image read unit 101 includes a CCD 1001, an A/D conversion module 1002 and a gain control module 1003 for converting the optical image information optically read into digital image signal.

The image engine control unit 1000 comprises the system controller 231, the process controller 211 and the memory module 222 in the image memory control unit 102, and incorporates the image processor 204, the image memory access control unit 221 and the image data control unit 203 for bus control in one group.

The image write unit 104 comprises the video data control unit 205 and the image formation unit (engine) 206.

Assume that the specification and performance of the image read unit 101 has been changed. In the digital composite apparatus, the system data interface is held, and therefore only the image read unit 101 is required to be changed. The other units are not required to be changed. In the case where image formation unit (engine) 206 is changed, the system can be reconstructed by changing the image write unit 104 alone.

As described above, the units depending on the input/output devices make up a system with separate configurations, and therefore as long as the data interface is held, the system can be upgraded by a minimum change of units.

In the case where the same image formation unit (engine) 206 as in the digital composite apparatus is used as the unit printer as shown in FIG. 11, the digital copier can double as the image write unit 104.

In the case where the image processing apparatus is used as a unit printer, the image read unit 101 is not required, and is removed from the system configuration of the digital composite apparatus. The image engine control unit 1000, if shared in operation with the digital composite apparatus, can exhibit its function at the sacrifice of extraneous specifications. Further, the image processor 204 is not required. Therefore, the cost effectiveness is optimized by configuring an optimum controller for the system with a separate substrate.

In the configuration of the image engine control unit 1000 as shown in FIG. 10, the image processor 204, the image data control unit 203 and the image memory access control unit 221 are each configured with an independent module (component). In using the image engine control unit 1000 as a controller, therefore, the non-required modules are removed while common modules are shared. In this way, similar functions are realized by use of common modules without producing the module for controlling the image engine and the module for the controller separately from each other.

The specifics of image processing by the image processing apparatus will be explained here. FIG. 12 is a diagram for explaining an outline of scanner (an example of a space filter) of an image processing apparatus. The MTF correction function is realized by the configuration of the space filter.

In FIG. 12, in the case where the two-dimensional space filter is configured with filter coefficients A to Y, all the images of the input image data are processed through the filter with the same arithmetic operation. In the case where the processing by the space filter based on the input image data (i rows, j columns) is intended, for example, the arithmetic operation is carried out with a corresponding coefficient for an image of row i and column j. An arithmetic operation with a coefficient M is performed for the pixel (i, j), and the arithmetic operation with the coefficient N is carried out for the pixel (i, j+1). The result of calculation in the filter matrix is output as the processing result of the intended pixel (i, 1).

In the case where the intended pixel is (i, j+1), the arithmetic operation with a coefficient M is carried out for the pixel (i, j+1), and the arithmetic operation with a coefficient N is carried out for the pixel (i, j+2). The calculation result in the filter matrix is output as the result of processing the intended pixel (i, j+1).

Input image data are different, and the parameters for processing are common in this space filter processing. The values of coefficients A to Y are not fixed, but can be changed arbitrarily in accordance with the input image characteristics or the desired image quality. If the coefficient values cannot be so changed, the versatility of the image processing function may not be secured.

For the operation of the image processor 204, the coefficient values are downloaded from the process controller 211. Even in the case where the configuration of the read unit is changed or the read image deterioration characteristic is changed, the system change requirement can be met by changing the contents of the data loaded.

Figure 13:
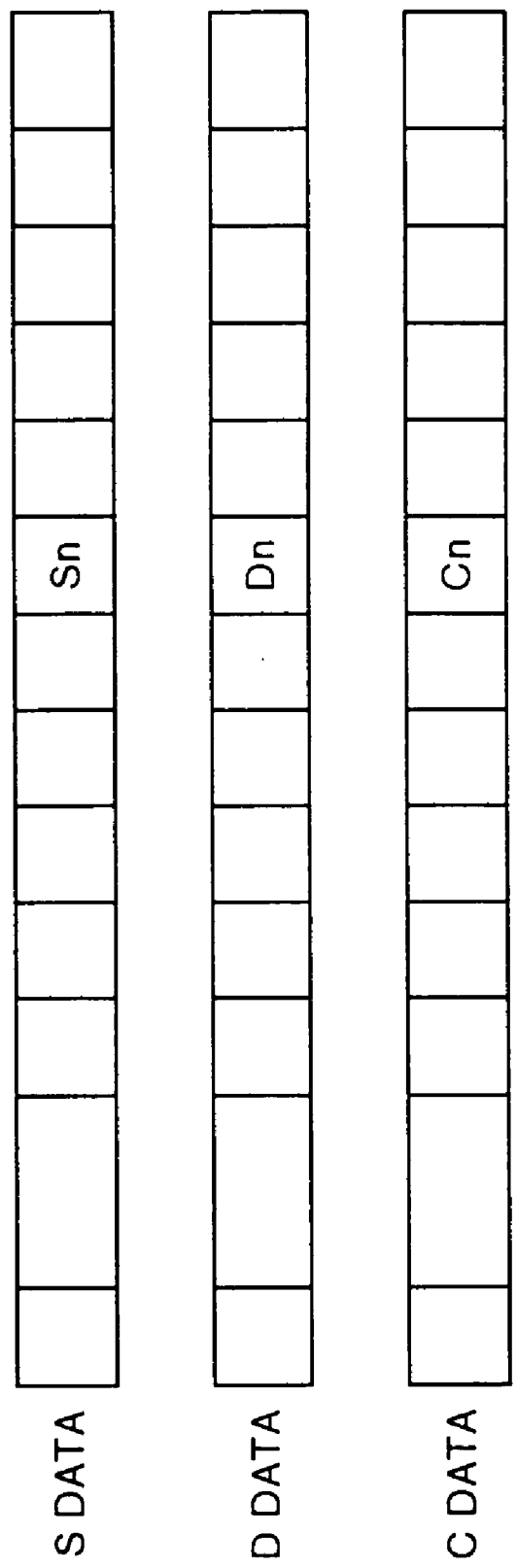
FIG. 13 is a diagram for explaining an outline of the shading correction of an image processing apparatus according to an embodiment.
Figure 14:
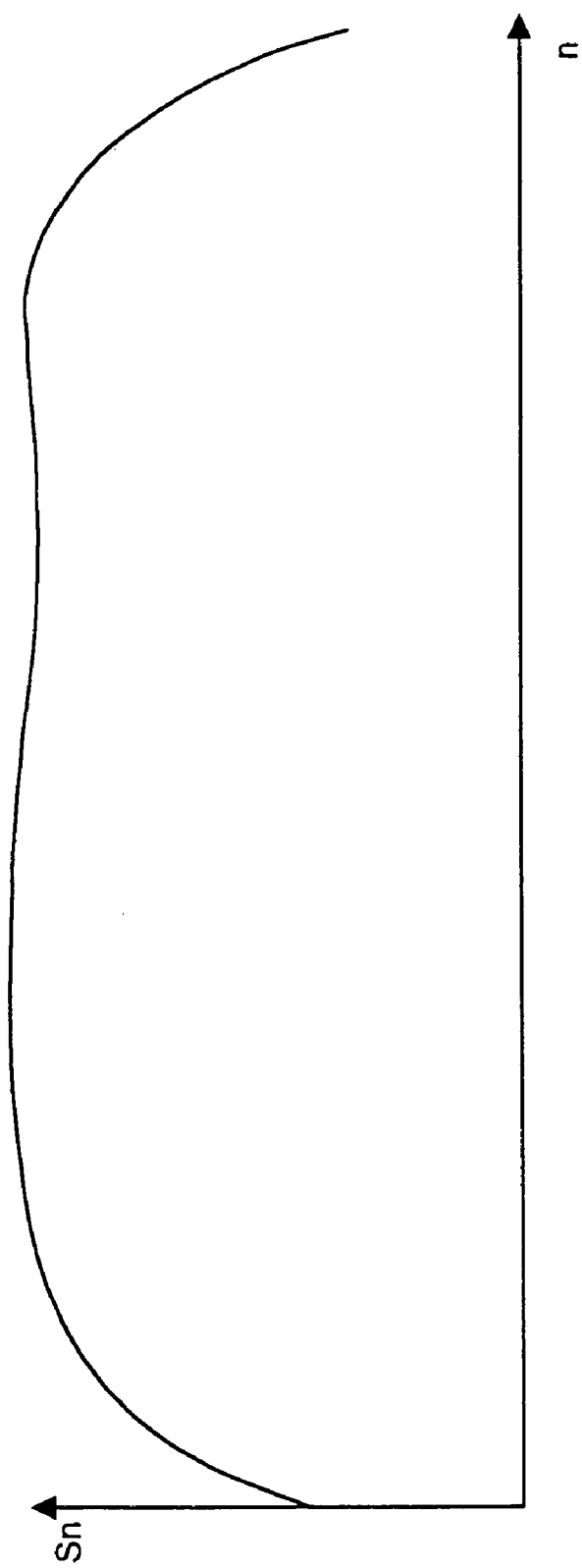
FIG. 14 is a diagram for explaining an outline of the shading data of an image processing apparatus according to an embodiment.

FIG. 13 is a diagram for explaining an outline of the shading correction by the image processing apparatus. FIG. 14 is a diagram for briefly explaining the shading data. The shading correction is for correcting the uneven characteristic of the reflected light based on the illuminance distribution of a lighting system. Prior to the reading of an original, a reference white board having a uniform density is read to produce reference data for shading correction. Based on this shading data, the reflection distribution dependent on the read position of the read image is normalized.

As shown in FIG. 14, the shading data has a different reflection distribution depending on the read position n of the original. At an end of the read position of the original, the white board of uniform density is read dark. Character Sn designates the signal level of reading the white board at a read position n. The larger the value Sn, the brighter the white board is read.

In shading correction, the process of the same specifics is carried out for all the position-dependent read image data thereby to correct the irregular light amount distribution of the lamp. The S data as shown in FIG. 13 is the shading data generated by reading the white board as shown in FIG. 14. The D data as shown in FIG. 13 is the image data read on each read line. Character n designates the read position.

The C data is the one after shading correction of the D data, and is normalized as $$Cn = A \times (Dn/Sn)$$

where A is the normalization coefficient.

In the image processor 204, the S data is stored in the local memory, and the calculation for correcting the input D data is carried out between corresponding Dn and Sn.

Figure 15:
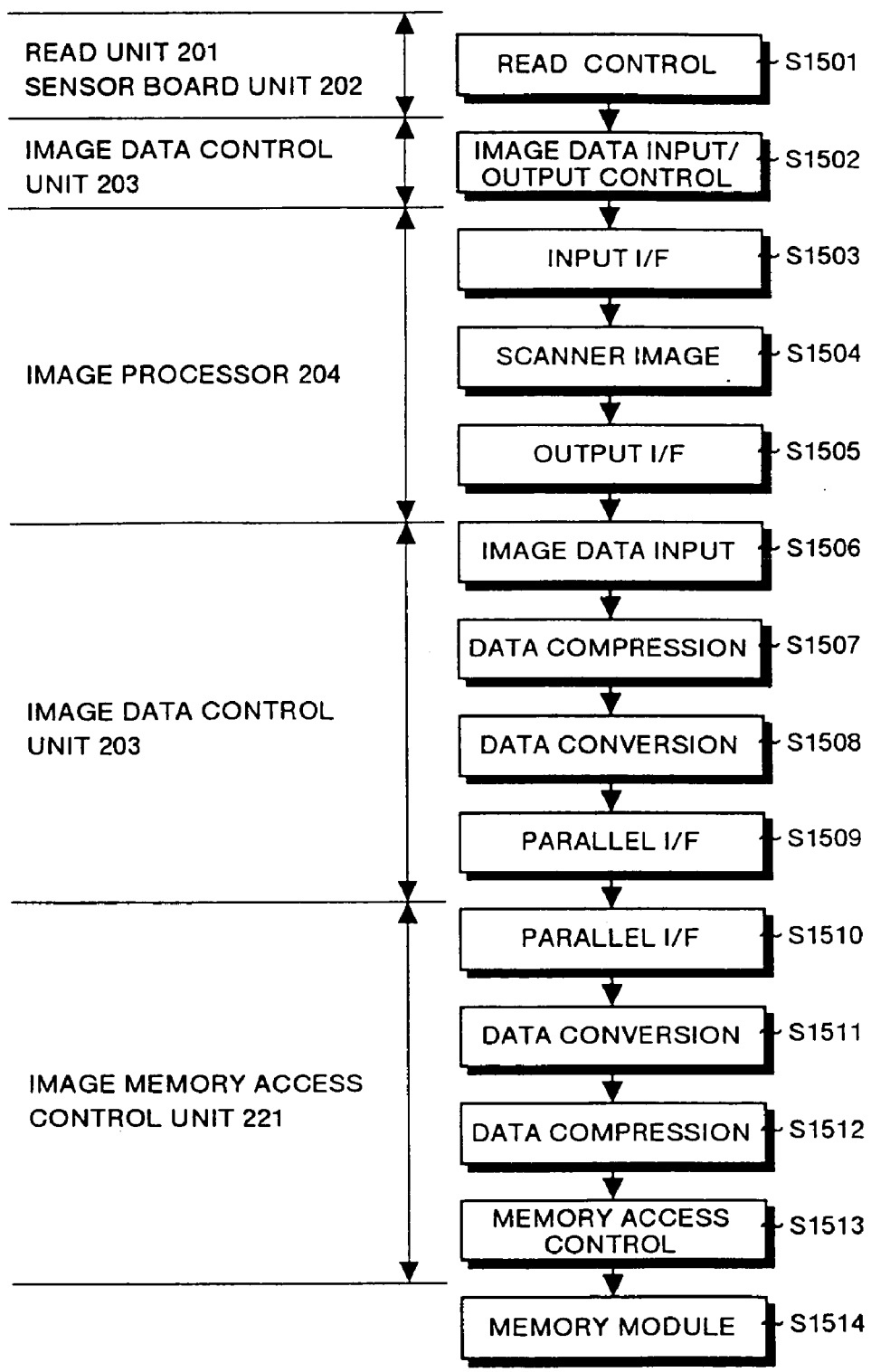
FIG. 15 is a diagram for explaining an example of the flow of the image data of an image processing apparatus according to an embodiment.
Figure 16:
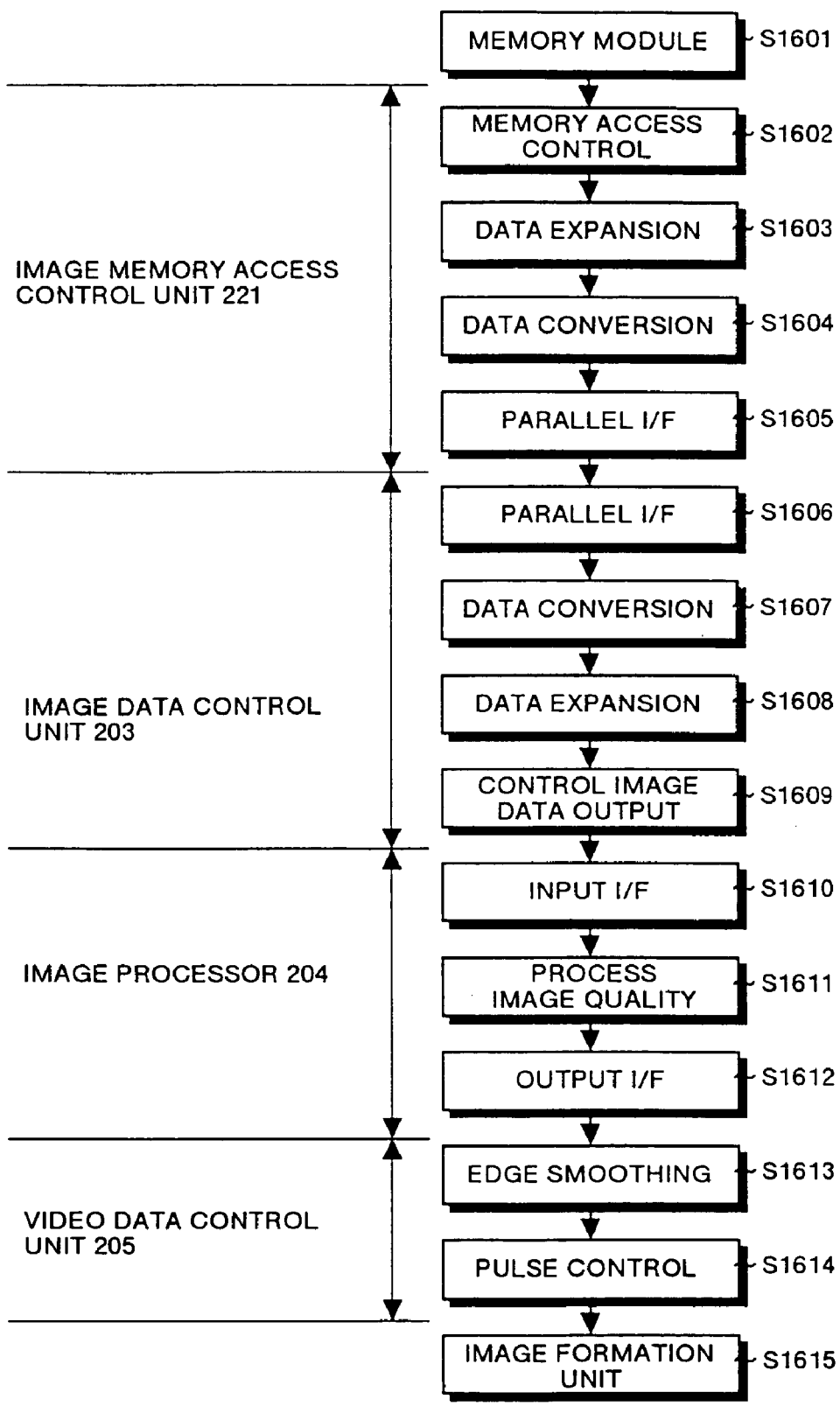
FIG. 16 is a diagram for explaining another example of the flow of the image data of an image processing apparatus according to an embodiment.

The process for accumulating the images in the memory module 222 will be explained here. FIG. 15 and FIG. 16 are diagrams for explaining the data flow in the image processing apparatus constituting a digital composite apparatus in which images are accumulated in the memory module 222.

FIG. 15 shows the flow of data from the read unit 201 to the memory module 222, and FIG. 16 shows the flow of data from the memory module 222 to the image formation unit 206. Each process is executed by controlling the data flow between the bus and the units under the control of the image data control unit 203.

As shown in FIG. 15, the read unit 201 and the sensor board unit 202 performs the read control operation (step S1501). The image data control unit 203 performs the input processing and the output control of the image data (step S1502). The image processor 204 performs the input I/F control processing (step S1503), the above-described scanner image processing (step S1504), and the output I/F processing (step S1505).

The image data control unit 203 again performs the input processing of the image data (step S1506), the data compression (step S1507) and the data conversion (step S1508), followed by the parallel I/F control processing (step S1509).

The image memory access control unit 221 performs the parallel I/F control operation (step S1510), the data conversion (step S1511), data compression (step S1512), and the memory access control of the memory module 222 (step S1513). As a result, the image data are stored in the memory module 222 (step S1514).

As shown in FIG. 16, for the image data stored in the memory module 222 (step S1601), the image memory access control unit 221 performs the memory access control (step S1602), the data expansion (step S1603), the data conversion (step S1604) and the parallel I/F control operation (step S1605).

The image data control unit 203 performs the parallel I/F control operation (step S1606), the data conversion (step S1607), the data expansion (step S1608), and the image data output control (step S1609).

The image processor 204 performs the input I/F control operation (step S1610), the image quality processing (step S1611), and the output I/F control processing (step S1612).

The video data control unit 205 performs the edge smoothing processing (step S1613) and the pulse control (step S1614). After that, the image formation unit 206 performs the image formation (step S1615).

The read image data are subjected to the scanner image processing in the image processor 204, and the image data to be output to the image formation unit 206 is subjected to image quality processing in the image processor 204, independently of each other.

The scanner image processing and the image quality processing can be performed in parallel. The read image processing is carried out for facsimile transmission. The image data accumulated in the memory module in advance can be output to the transfer paper while changing the contents of the image quality processing.

Figure 17:
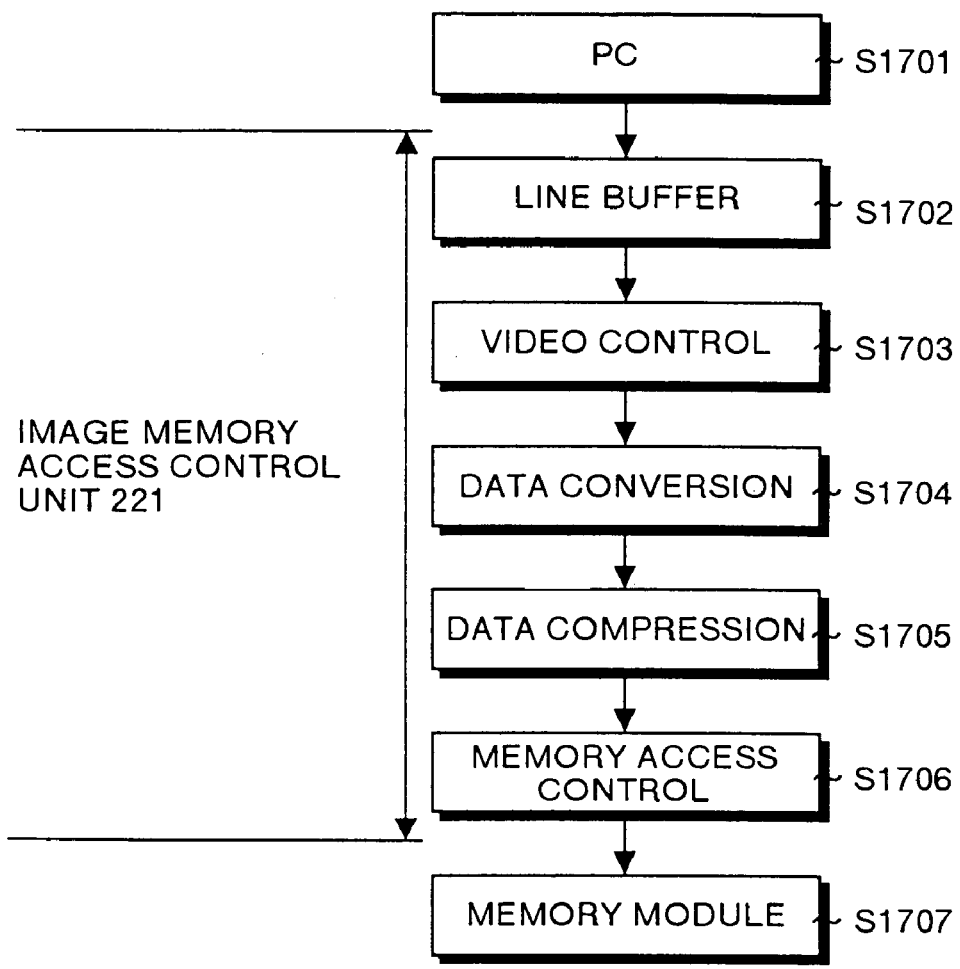
FIG. 17 is a diagram for explaining still another example of the flow of the image data of an image processing apparatus according to an embodiment.
Figure 18:
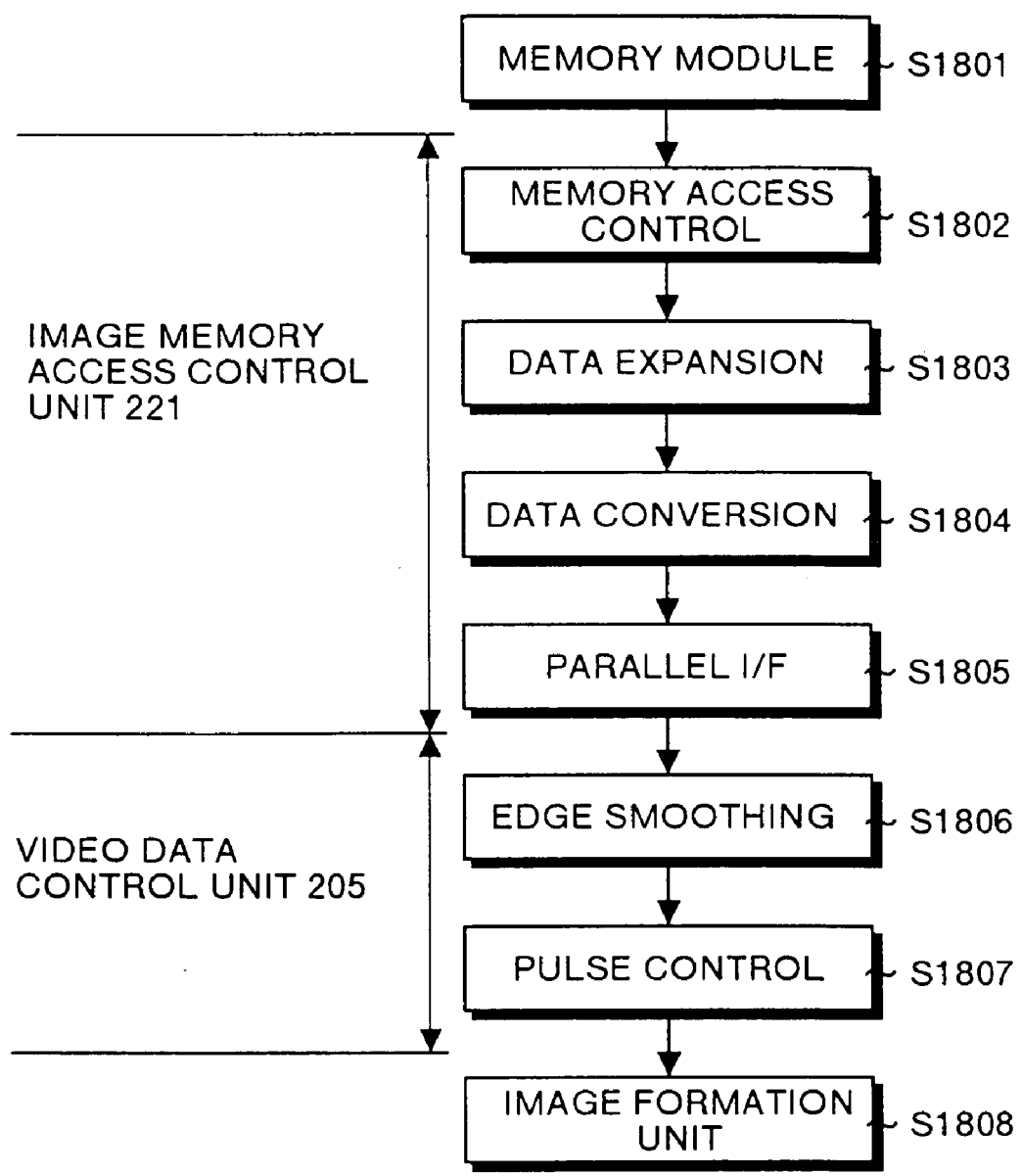
FIG. 18 is a diagram for explaining yet another example of the flow of the image data of an image processing apparatus according to an embodiment.

FIG. 17 and FIG. 18 are diagrams for explaining the flow of the data of the image processing apparatus as a unit printer for executing the process of accumulating the image in the memory module 222. FIG. 17 shows the flow of the data from the PC 223 to the memory module 222, and FIG. 18 shown the flow of the data from the memory module 222 to the image formation unit 206.

As shown in FIG. 17, the PC 223 outputs the image data (step S1701), the image memory access control unit 221 holds the image data in the line buffer (step S1702), the controls the video (step S1703), converts the data (step S1704) and compresses the data (step S1705), and controls the memory access to the memory module 222 (step S1706). As a result, the image data is stored in the memory module 222.

As shown in FIG. 18, as for the image data stored in the memory module 222 (step S1801), the image memory access control unit 221 controls the memory access (step S1802) expands the data (step S1803), converts the data (step S1804), and controls the parallel I/F control (step S1805).

The video data control unit 205 smoothes the edge (step S1806) and controls the pulses (step S1807). After that, the image formation unit 206 forms the image (step S1808).

In this way, the code data from the PC 223 is converted to the image data and temporarily stored in the memory module 222. When outputting a plurality of sheets, only one data expansion period is involved, and therefore the printing performance is improved as compared with the controller engaged in the expansion process each time.

For the image data read from the memory module 222, a reproduced image can be formed on the paper with a plurality of variations of the same image by changing the contents of the post-processing in the video data control unit 205. The code data is not required to be expanded into the image data each time the parameters for the edge smoothing process and the pulse control process are changed in the video data control unit 205.

Figure 19:
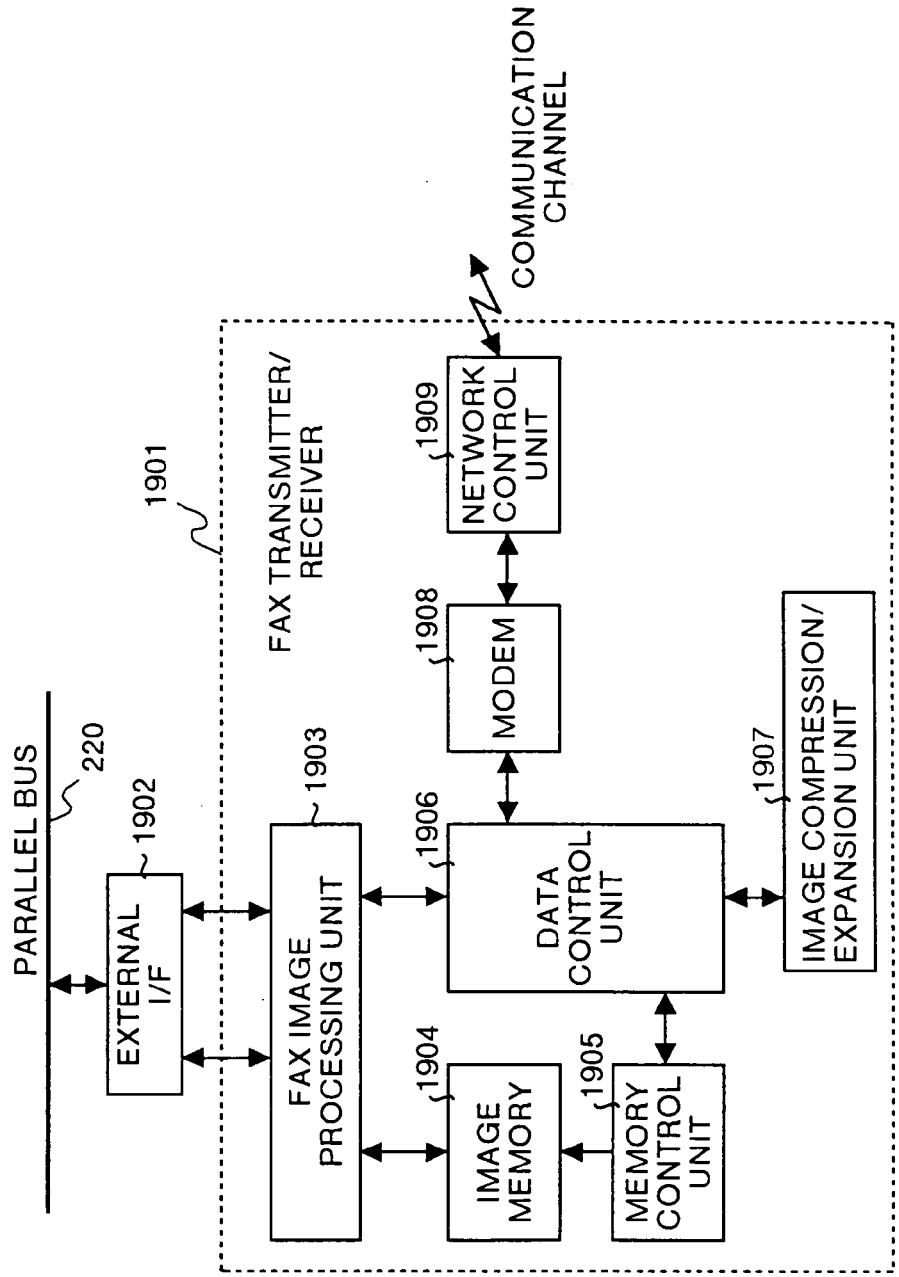
FIG. 19 is a block diagram showing a configuration of a facsimile control unit of an image processing apparatus according to an embodiment.

The functional configuration of the facsimile control unit 224 will be explained here. FIG. 19 is a block diagram showing a configuration of the facsimile control unit 224.

As shown in the block diagram of FIG. 19, the facsimile control unit 224 includes a facsimile transmitter/receiver 1901 and an external I/F 1902. The facsimile transmitter/receiver 1901 converts the image data into a communication format and transmits it to an external line on the one hand, and returns the external data to the image data and outputs by recording it in the image formation unit through the external I/F unit 1902 and the parallel bus 220 on the other hand.

The facsimile transmitter/receiver 1902 includes a facsimile image processing unit 1903, an image memory 1904, a memory control unit 1905, a data control unit 1906, an image compression/expansion unit 1907, a modem 1908 and a network control unit 1909.

Among these component parts, the binary smoothing process for the received image for the facsimile image processing is carried out in the edge smooth processing unit 801 in the video data control unit 205 as shown in FIG. 8. Also, with regard to the image memory 1904, a part of the output buffer function is transferred to the image memory access control unit 221 and the memory module 222.

In the facsimile transmitter/receiver 1901 configured as described above, when the transmission of the image data is started, the data control unit 1906 issues a command to the memory control unit 1905 to sequentially read the image data accumulated in the image memory 1904. The image data thus read out is restored to the original signal by the facsimile image processing unit 1903. At the same time, the magnification and the density of the image data are changed, and applied to the data control unit 1906.

The image data added to the data control unit 1906 is code compressed by the image compression/expansion unit 1907, modulated by the modem 1908, and then sent out to the destination through the network control unit 1909. The image information, upon complete transmission, is deleted from the image memory 1904.

At the time of reception, the received image is temporarily accumulated in the image memory 1904. In the case where the received image can be recorded and output at that time, it is recorded and output upon receipt of an image corresponding to one sheet. In the case where a call arrives and the receiving is started during the copying operation, the data is accumulated in the image memory 1904 until the utilization rate of the image memory 1904 reaches a predetermined value, for example, 80%. When the utilization rate of the image memory 1904 reaches 80%, the write operation being performed is forcibly suspended, and the received image is read, recorded and output from the image memory 1904.

The received image read from the image memory 1904 is deleted from the image memory 1904, and when the utilization rate of the image memory 1904 drops to a predetermined value, for example, 10%, the write operation thus far suspended is restarted. Upon completion of these write operation, the remainder of the received image is recorded and output. In order to permit the write operation to be restarted after suspension, the various parameters for write operation are internally saved during the suspension, and internally restored at the time of restart.

Figure 20:
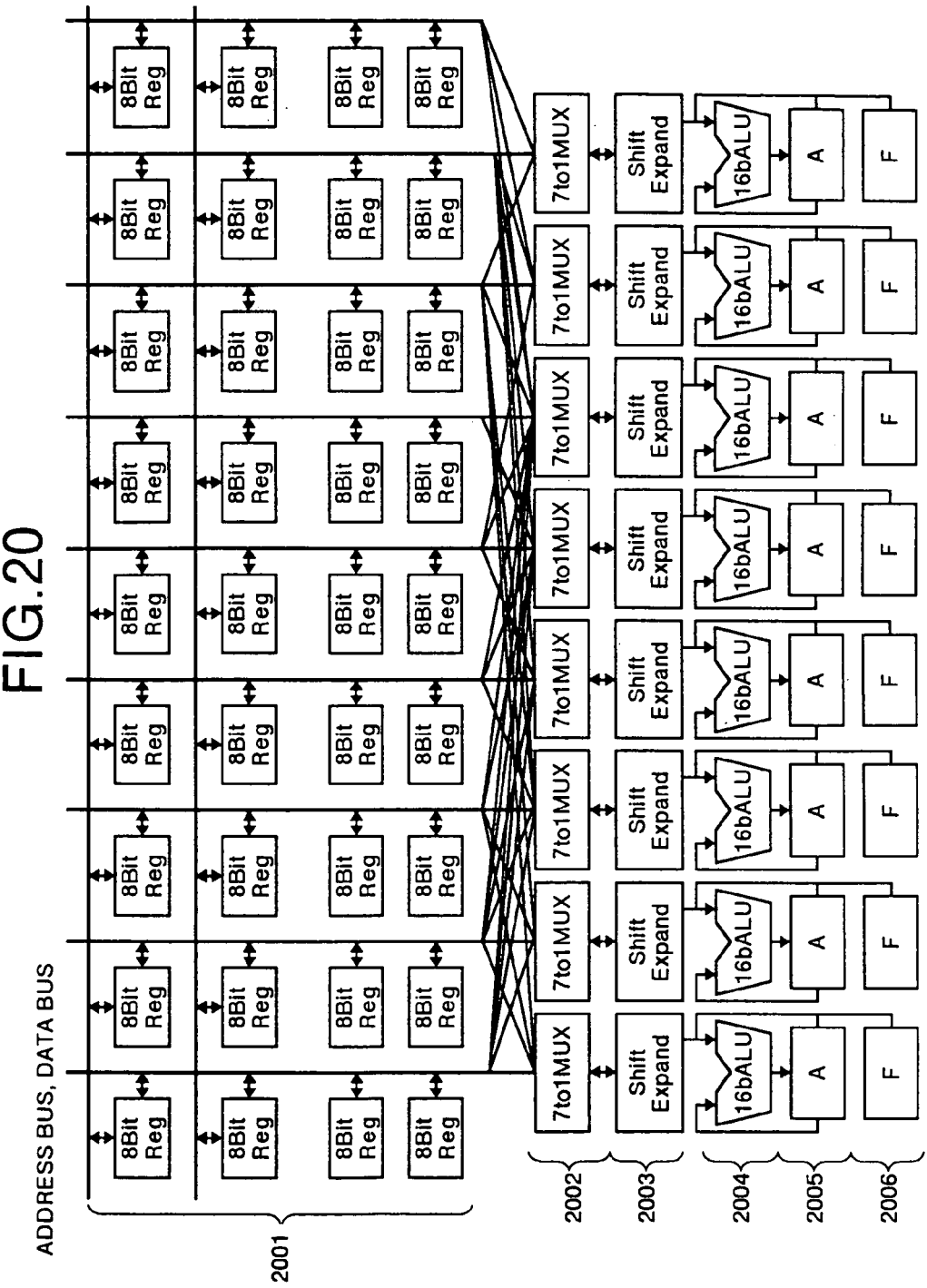
FIG. 20 is a diagram for explaining a general configuration of a SIMD processor used with an image processing apparatus according to an embodiment.

FIG. 20 is a diagram for explaining a general configuration of the SIMD (Single Instruction Multiple Data stream) processor. SIMD is for causing a single instruction to be executed for a plurality of data in parallel and involves a plurality of PEs (processor elements).

Each PE includes a register (Reg) 2001 for storing data, a multiplexer (MUX) 2002 for accessing the registers of other PEs, a barrel shifter (shift expand) 2003, an arithmetic and logic unit (ALU) 2004, an accumulator (A) 2005 for storing the logic result, and a temporary register (F) 2006 for temporarily storing the contents of the accumulator 2005.

Each register 2001 is connected to an address bus and a data bus (read line and word line) for storing the instruction code specifying the process and the data to be processed. The contents of the register 2001 are input into the ALU 2004, and the result of arithmetic operation is stored in the accumulator 2005. In order to retrieve the result out of the PE, the data is temporarily saved in the temporary register 2006. By retrieving the contents of the temporary register 2006, the result of processing the data involved is obtained.

The instruction code of the same contents is supplied to each PE, the data to be processed in different forms are supplied to different PEs, and the contents of the register 2001 of the adjacent PEs are accessed in the multiplexer 2002. Thus, the result of the arithmetic operation are processed in parallel and output to each accumulator 2005.

Assume, for example, that the contents of a line of image data are arranged after each pixel and in the PE and arithmetically processed with the same instruction code. In this way, the processing result for each line can be obtained earlier than when the pixels are sequentially processed one by one. Especially, the space filter processing and the shading correction can be executed for all the PEs at a time by the arithmetic equation.

Figure 21:
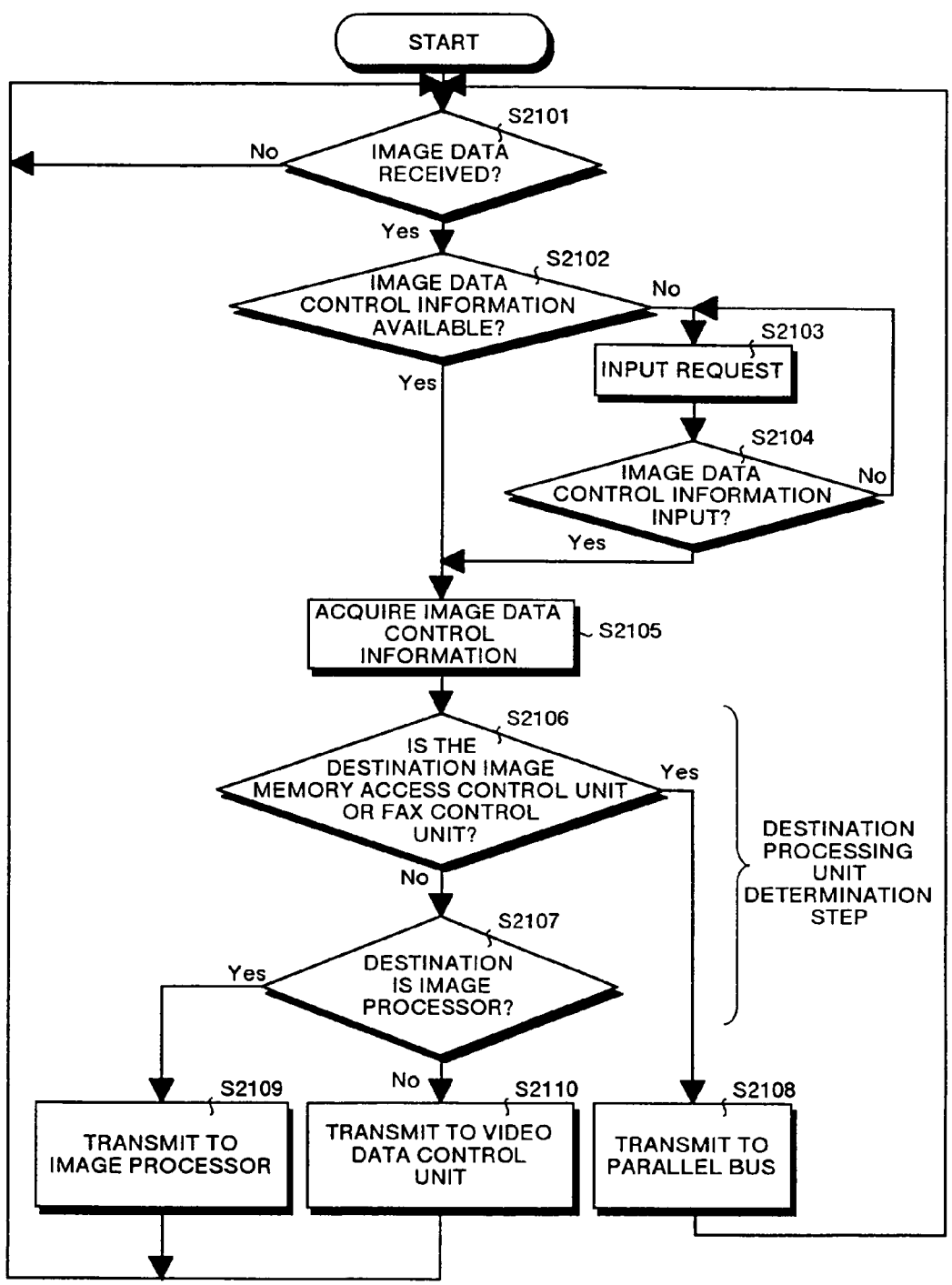
FIG. 21 is a flowchart showing a series of steps of the process in an image processing method according to an embodiment.
Figure 22:
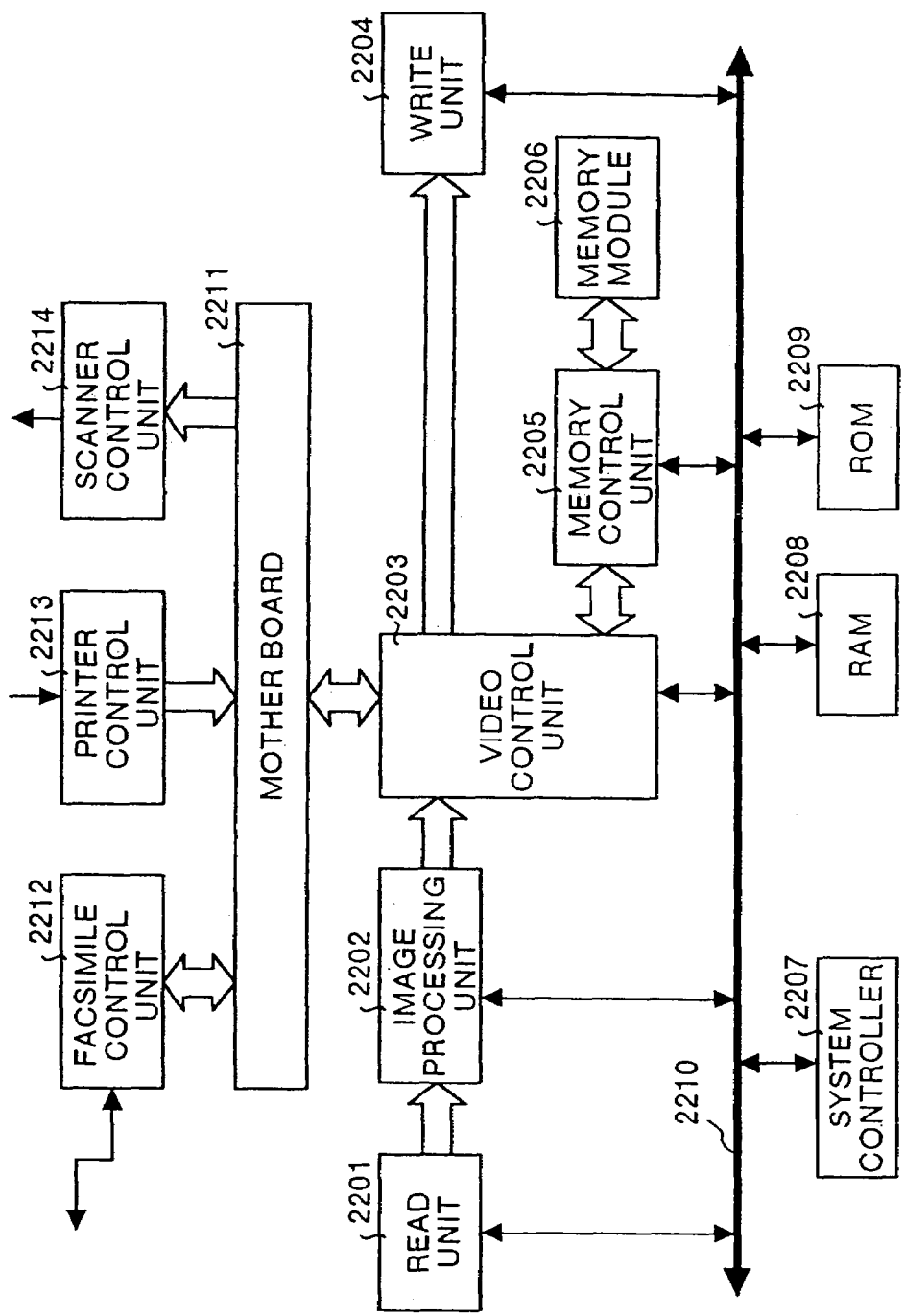
FIG. 22 is a block diagram showing a hardware configuration of a digital composite apparatus according to the conventional art.

A series of processes for an image processing method according to this embodiment will be explained here. FIG. 21 is a flowchart showing the steps of a series of process in an image processing method.

As shown in FIG. 21, the image data control unit 203 determines whether the image data has been received from other component parts (units) or not (step S2101). In the case where the receipt of the image data is awaited and the image data is received (YES at step S2101), it is determined whether the image data control information for the received image data is available or not (step S2102).

The image data control information is defined as the information on the manner in which the received image data is processed (controlled). As described above, in the case where such information is on the type of processing (copy, facsimile transmission, image reading, printing or the like) and the prints, the number of sheets to be processed or the like is stored. Normally, the image data control information is input by the operator through the input operation. Without such an input operation, however, it can be determined that "there is image data control information available" according to the features unique to the image data including the type of the image data.

In the case where there is no image data control information (step S2102) at step S2102, a request is issued to input the image data control information (step S2103). The input request is issued, for example, by displaying it on the operating panel 234 and thus prompting the operator to input the image data control information or the like.

After that, it is determined whether the operator has input the image data control information (whether he has depressed the operating button of the operating panel 234, for example) (step S2104), and in the case where the image data control information is not input (NO at step S2104), the process proceeds to step S2103, where an input request continues to be issued until the image data control information is actually input. Upon receipt of an input request, the process proceeds to step S2105.

At step S2105, the image data control information is acquired. After that, based on the acquired image data control information, it is determined whether the destination of the received image is the image memory access control unit 221 or the facsimile control unit 224 (step S2106).

In the case where the destination of the received image data is the image memory access control unit 221 or the facsimile control unit 224 at step S2106 (YES at step S2106), the image data is transmitted to the parallel bus 220 (step S2108). After that, the process proceeds to step S2101 and the receipt of a new image data is awaited.

In the case where the destination of the received image data is not the image memory access control unit 221 or the facsimile control unit 224 at step S2106 (NO at step 2106), it is determined whether the destination of the received image data is the image processor 204 or not (step S2107).

In the case where the destination of the received image data is the image processor 204 at step S2107 (YES at step S2107), the image data is transmitted to the image processor 204 (step S2109). After that, the process proceeds to step S2101 and the receipt of a new image data is awaited.

In the case where the destination of the received image data is not the image processor 204 at step S2107 (NO at step S2107), it is determined that the image data is the one to be written and the image data is transmitted to the video data control unit 205 (step S2110). After that, the process proceeds to step S2101, and the receipt of a new image data is awaited. In this way, the image data control unit 203 repeats the process of transmitting/receiving the image data.

As described above, the image processing apparatus according to this embodiment can optimize the processing performance of the image data, and therefore the resources of the system can be effectively utilized for realizing a multiplicity of functions, thereby making possible optimum control of the system as a whole.

The image processing apparatus according to this embodiment can effectively utilize the image memory, while optimizing the processing of the accumulated images, thereby making it possible to control the adaptation to the input/output devices for the image memory control. In addition, the image processing of the image data can be optimized and the adaptation to the input/output devices for the image processing can be controlled.

By changing the program, the requirement of changing the system specification or the addition of functions can easily met. Since the image processing means is constituted of a SIMD processor, the image processing can be carried out with high-speed arithmetic operation.

Further, the image memory can be effectively utilized in the transmission/receiving process of the facsimile image.

In view of the fact that the image read unit, the image data control unit, the image memory control unit, the image processing unit, the image write unit and/or the facsimile control unit is constituted as independent units, the equipment having a similar data processing system such as MFP, unit scanner or unit printer can be easily fabricated as different devices, thereby making it possible to construct a low-cost, multi-purpose system.

Further, since the image data control information is input, the image data processing performance can be optimized by the image data control information that has been input. Furthermore, the parameters can be easily updated for the image processing algorithm or processing. Even with a system having a different performance of the microprocessor or the data transfer, the system change can be kept up with by a minimum unit change, and therefore the memory can be effectively used with a plurality of functional operations. As a result, the designer can easily improve the function of the digital composite apparatus, while at the same time providing the latest algorithm to the user of the digital composite apparatus.

The image processing method of the present invention can be realized by the computer such as a personal computer or a work station executing the program prepared in advance. This program is recorded in a computer readable recording medium such as a hard disk, floppy disk, CD-ROM, MO or DVD, and executed by being read from the recording medium by the computer. This program can be distributed through the recording medium and a network such as an internet.

As described above, according to one aspect of the invention, with image processing apparatus the performance of processing the image data can be optimized. As a result, the resources of the system can be effectively utilized for realizing multiple functions, thereby making it possible to provide an image processing apparatus constituting a system that can be optimally controlled as a whole.

According to another aspect of the invention, with the image processing apparatus the image memory can be effectively utilized while optimizing the processing of the accumulated image. As a result, the resources of the system can be effectively utilized for realizing multiple functions, thereby making it possible to provide an image processing apparatus constituting a system that can be optimally controlled as a whole.

Further, the adaptation to the input/output devices for image memory control can be controlled. As a result, the resources of the system can be effectively utilized for realizing multiple functions, thereby making it possible to provide an image processing apparatus constituting a system that can be optimally controlled as a whole.

According to still another aspect of the invention, with the image processing apparatus the image processing of the image data can be optimized. As a result, the resources of the system can be effectively utilized for realizing multiple functions, thereby making it possible to provide an image processing apparatus constituting a system that can be optimally controlled as a whole.

Further, the adaptation to the input/output devices for image processing can be controlled. As a result, the resources of the system can be effectively utilized for realizing multiple functions, thereby making it possible to provide an image processing apparatus constituting a system that can be optimally controlled as a whole.

Further, the resources of the system can be effectively utilized for realizing multiple functions, thereby making it possible to provide an image processing apparatus constituting a system that can be optimally controlled as a whole.

Further, the requirement for the change of the system specification and the addition of functions can be easily met by changing the program. As a result, the resources of the system can be effectively utilized for realizing multiple functions, thereby making it possible to provide an image processing apparatus constituting a system that can be optimally controlled as a whole.

Further, the image processing can be performed with high-speed arithmetic operation. As a result, the resources of the system can be effectively utilized for realizing multiple functions, thereby making it possible to provide an image processing apparatus constituting a system that can be optimally controlled as a whole.

Further, the transmission and reception of image data between the various means controlled by different processors can be smoothed. As a result, the resources of the system can be effectively utilized for realizing multiple functions, thereby making it possible to provide an image processing apparatus constituting a system that can be optimally controlled as a whole.

Further, the image memory can be effectively used in the process of transmitting/receiving the facsimile image. As a result, the resources of the system can be effectively utilized for realizing multiple functions, thereby making it possible to provide an image processing apparatus constituting a system that can be optimally controlled as a whole.

Further, the equipment can be easily produced differently and therefore a multi-purpose system can be constructed with low cost. As a result, the resources of the system can be effectively utilized for realizing multiple functions, thereby making it possible to provide an image processing apparatus constituting a system that can be optimally controlled as a whole.

According to still another aspect of the invention, with the image processing method, the performance of processing image data can be optimized. As a result, the resources of the system can be effectively utilized for realizing multiple functions, thereby making it possible to provide an image processing apparatus constituting a system that can be optimally controlled as a whole.

Further, the performance of processing the image data can be optimized by the input image data control information. As a result, the resources of the system can be effectively utilized for realizing multiple functions, thereby making it possible to provide an image processing apparatus constituting a system that can be optimally controlled as a whole.

According to still another aspect of the invention, there is provided a recording medium for storing a program for the computer to execute the image processing method described above so that the particular program can be read mechanically, thereby making it possible for the computer to execute the method.

The present document incorporated by reference the entire contents of Japanese priority documents, 11-125059 filed in Japan on Apr. 30, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
   at least one of an image reading unit which reads a first image data, an image memory control unit which writes/reads a second image data by controlling a memory, an image processing unit which processes the first and second image data to obtain a third image data, and an image writing unit which prints an image corresponding to the third image data on a paper; and
   an image data control unit which receives at least one of the first image data, the second image data, and the third image data, and transmits received image data to any one of said image memory control unit, said image processing unit, and said image writing unit,
   wherein said image memory control unit is commonly used by a plurality of applications including at least one of a facsimile application, a scanner application, a printer application, and a copier application, and
   the image processing unit includes a plurality of interfaces each corresponding to one of the image reading unit and the image writing unit, and is configured to perform image data processing independently for each of the image reading unit and the image writing unit.

2. The image processing apparatus according to claim 1, wherein said image processing is realized with a processor and a program of this processor is changeable.

3. The image processing apparatus according to claim 1, wherein said image processing is realized with an SIMD (Single Instruction Multiple Data stream) processor.

4. The image processing apparatus according to claim 1, further comprising:
   a first processor which controls any of said image reading unit, said image processing unit, and said image writing unit through a first bus; and
   a second processor which controls said image memory control unit through a second bus,
   wherein said image data control unit controls an interface between said first bus and said second bus.

5. The image processing apparatus according to claim 4, further comprising:
   a facsimile control unit connected to any of said image memory control unit and said image data control unit through said second bus, said facsimile control unit transmits or receives a facsimile image from or to any of said image memory control unit and said image data control unit.

6. The image processing apparatus according to claim 5, wherein said image reading unit, said image data control unit, said image memory control unit, said image processing unit, said image writing unit, and said facsimile control unit are configured as independent units.

7. An image processing apparatus comprising:
at least one of an image reading unit which reads a first image data, an image processing unit which processes the first image data to obtain a second image data, and an image writing unit which prints an image corresponding to the second image data on a paper; and
an image data control unit which receives at least one of the first image data and the second image data, and stores the received image data into a memory, and transmits the image data stored in the memory to any one of said image processing unit and said image writing unit,
wherein said image memory control unit is commonly used by a plurality of applications including at least one of a facsimile application, a scanner application, a printer application, and a copier application, and
the image processing unit includes a plurality of interfaces each corresponding to one of the image reading unit and the image writing unit, and is configured to perform image data processing independently for each of the image reading unit and the image writing unit.

8. The image processing apparatus according to claim 7, wherein an image memory control unit is connected through said image data control unit to any of said image reading unit, said image processing unit, and said image writing unit, and
wherein said image data control unit transmits the image data stored in the memory to or receives the image data stored in the memory from said image memory control unit, and said image data control unit transmits the image data stored in the memory to any one of said image processing unit and said image writing unit.

9. The image processing apparatus according to claim 7, wherein said image processing is realized with a processor and a program of this processor is changeable.

10. The image processing apparatus according to claim 7, wherein said image processing is realized with an SIMD (Single Instruction Multiple Data stream) processor.

11. The image processing apparatus according to claim 8, further comprising:
a first processor which controls any of said image reading unit, said image processing unit, and said image writing unit through a first bus; and
a second processor which controls said image memory control unit through a second bus,
wherein said image data control unit controls an interface between said first bus and said second bus.

12. The image processing apparatus according to claim 11, further comprising:
a facsimile control unit connected to any of said image memory control unit and said image data control unit through said second bus, said facsimile control unit transmits or receives a facsimile image from or to any of said image memory control unit and said image data control unit.

13. The image processing apparatus according to claim 12, wherein said image reading unit, said image data control unit, said image memory control unit, said image processing unit, said image writing unit, and said facsimile control unit are configured as independent units.

14. An image processing apparatus comprising:
at least one of an image reading unit which reads a first image data, an image memory control unit which writes/reads a second image data by controlling a memory, and an image writing unit which prints an image corresponding to the second image data on a paper; and
an image processing unit which receives at least one of the first image data and the second image data, processes the received image data, and transmits the processed image data stored in the memory to any one of said image memory control unit and said image writing unit,
wherein said image memory control unit is commonly used by a plurality of applications including at least one of a facsimile application, a scanner application, a printer application, and a copier application and
the image processing unit includes a plurality of interfaces each corresponding to one of the image reading unit and the image writing unit and is configured to perform image data processing independently for each of the image reading unit and the image writing unit.

15. The image processing apparatus according to claim 14, wherein said image processing unit is connected through said image data control unit to any of said image reading unit, said image memory control unit, and said image writing unit, and
wherein said image data control unit transmits at least one of the first image data and second image data to or receives the processed image data from said image processing unit, and said image data control unit transmits at least one of the first image data, second image data, and processed image data stored in the memory to any one of said image memory control unit and said image writing unit, and said image data control unit receives at least one of the first image data, second image data, and processed image data stored in the memory from at least one of said image reading unit and said image memory control unit.

16. The image processing apparatus according to claim 14, wherein said image processing unit includes,
a correcting unit which corrects a deterioration of information of the first image data; and
an image quality processing unit which processes image quality of the received image data corrected by said correcting unit or the second image data in accordance with an image formation characteristic.

17. The image processing apparatus according to claim 14, wherein said image processing is realized with a processor and a program of this processor is changeable.

18. The image processing apparatus according to claim 14, wherein said image processing is realized with an SIMD (Single Instruction Multiple Data stream) processor.

19. The image processing apparatus according to claim 15, further comprising:
a first processor which controls any of said image reading unit, said image processing unit, and said image writing unit through a first bus; and
a second processor which controls said image memory control unit through a second bus,
wherein said image data control unit controls an interface between said first bus and said second bus.

20. The image processing apparatus according to claim 19, further comprising:

a facsimile control unit connected to any of said image memory control unit and said image data control unit through said second bus, said facsimile control unit transmits or receives a facsimile image from or to any of said image memory control unit and said image data control unit.

21. The image processing apparatus according to claim 20, wherein said image reading unit, said image data control unit, said image memory control unit, said image processing unit, said image writing unit, and said facsimile control unit are configured as independent units.

22. An image processing method comprising the steps of:

receiving an image data from any one of a plurality of processing units for processing the image data differently, including an image data read process, an accumulation, an image processing, a write operation and a transmission/receiving process;

storing the image data in an image memory control unit commonly used by a plurality of applications including at least one of a facsimile application, a scanner application, a printer application, and a copier application;

acquiring image data control information including information on contents of the image processing for the image data received at the image data receiving step;

determining a destination processing unit for transmitting the image data received by the image data receiving step, based on the image data control information acquired at the image data control information acquisition step; and transmitting the image data received by the receiving step to the destination processing unit determined by the determining step, and the image processing process includes a plurality of interfaces each corresponding to one of the scanner application and the printer application, and is configured to perform the image data processing independently for each of the scanner application and the printer application.

23. The image processing method according to claim 22, further comprising the step of:

inputting the image data control information, wherein the acquiring step acquires the image data control information input at the inputting step.

24. A computer readable medium for storing instructions, which when executed by a computer, causes the computer to perform the steps of:

receiving an image data from any one of a plurality of processing units for processing the image data differently, including an image data read process, an accumulation, an image processing, a write operation and a transmission/receiving process;

storing the image data in an image memory control unit commonly used by a plurality of applications including at least one of a facsimile application, a scanner application, a printer application, and a copier application;

acquiring image data control information including information on contents of the image processing for the image data received at the image data receiving step;

determining a destination processing unit for transmitting the image data received by the image data receiving step, based on the image data control information acquired at the image data control information acquisition step; and transmitting the image data received by the image data receiving step to the destination processing unit determined by the determining step, and the image processing process includes a plurality of interfaces each corresponding to one of the scanner application and the printer application, and is configured to perform the image data processing independently for each of the scanner application and the printer application.

* * * * *

UNITED STATES PATENT AND TRADEMARK OFFICE
CERTIFICATE OF CORRECTION

PATENT NO. : 6,930,793 B1  Page 1 of 1
DATED : August 16, 2005
INVENTOR(S) : Namizuka et al.

It is certified that error appears in the above-identified patent and that said Letters Patent is hereby corrected as shown below:

Title page,
Item [75], Inventors, should read:
-- Yoshiyuki Namizuka, Kanagawa (JP);
Yuji Takahashi, Kanagawa (JP);
Shinya Miyazaki, Tokyo (JP);
Sugitaka Oteki, Tokyo (JP); Takako Satoh, Kanagawa (JP); Rie Ishii,
Tokyo, (JP); Takeharu Tone, Tokyo (JP);
Hiroaki Fukuda, Kanagawa (JP);
Hiroyuki Kawamoto, Kanagawa (JP);
Yasuyuki Nomizu, Kanagawa (JP);
Fumio Yoshizawa, Kanagawa (JP);
Hideto Miyazaki, Kanagawa (JP) --.

Signed and Sealed this

First Day of November, 2005

JON W. DUDAS
*Director of the United States Patent and Trademark Office*